US012766897B1

(12) United States Patent
Rydalch

(10) Patent No.: US 12,766,897 B1
(45) Date of Patent: Oct. 20, 2026

(54) TRAILER CHAIN TENSIONING SYSTEM

(71) Applicant: Robert Rydalch, Middleton, ID (US)

(72) Inventor: Robert Rydalch, Middleton, ID (US)

( * ) Notice: Subject to any disclaimer, the term of this patent is extended or adjusted under 35 U.S.C. 154(b) by 668 days.

(21) Appl. No.: 18/313,163

(22) Filed: May 5, 2023

(51) Int. Cl.
*B60D 1/58* (2006.01)
*B60D 1/18* (2006.01)
*B60D 1/28* (2006.01)

(52) U.S. Cl.
CPC ................. *B60D 1/58* (2013.01); *B60D 1/18* (2013.01); *B60D 1/28* (2013.01)

(58) Field of Classification Search
CPC ... B60D 1/18; B60D 1/28; B60D 1/58; B60D 1/85; B60D 1/187
USPC .......................................................... 280/457
See application file for complete search history.

(56) References Cited

U.S. PATENT DOCUMENTS 2,189,170 A 2/1940 Gaussoin
2,196,115 A 4/1940 Jacobson
2,225,130 A 12/1940 Otto et al.
2,788,990 A 4/1957 Barcafer
2,815,225 A 12/1957 Barcafer
2,937,885 A 5/1960 Skow
2,954,988 A 10/1960 Hallock
3,123,383 A 3/1964 Humpal
3,265,407 A 8/1966 Paddock
3,501,168 A 3/1970 Heffington
3,549,173 A 12/1970 Stanfield
3,608,931 A 9/1971 Skromme et al.
3,667,780 A 6/1972 Abromavage et al.
3,697,099 A 10/1972 Potts et al.
3,724,875 A 4/1973 Hillman
3,782,759 A 1/1974 Thune
3,787,069 A 1/1974 Chauncey
3,827,722 A 8/1974 Miller et al.
3,873,131 A 3/1975 Adams
4,180,281 A 12/1979 Tertinek
4,198,073 A 4/1980 Olsen
4,271,401 A 6/1981 Meo
4,312,516 A 1/1982 Olsen
4,467,598 A 8/1984 Wells
(Continued)

OTHER PUBLICATIONS

Iron Eagle Trailers "What to look for in a trailer" accessed Nov. 12, 2025, at https://ironeagletrailers.com/ironeagle/what-to-look-for-in-a-trailer.jsp (Year: 2025).*

*Primary Examiner* — Valentin Neacsu
*Assistant Examiner* — Tyler Jay Stanley
(74) *Attorney, Agent, or Firm* — Hawley Troxell; Philip McKay

(57) ABSTRACT

A safety chain tensioner and mounting system includes a safety chain tensioner including a tension element such as a spring, tension spring, compression spring, rotary spring or the like that keeps a relatively constant, and dynamically/automatically adjustable tension on the safety chain such that any potential slack in the safety chains is automatically taken up by the relatively constant, and dynamically/automatically adjustable, tension on the safety chain provided by the safety chain tensioner. In one example, a first end of the safety chain tensioner is connected to a safety chain and a second end is connected to one of disclosed mounting systems. The mounting system is, in turn, attached to the trailer to be towed, typically to a frame of the trailer to be towed.

20 Claims, 39 Drawing Sheets

(56) References Cited

U.S. PATENT DOCUMENTS

| | | | |
|---|---|---|---|
| 4,946,185 | A | 8/1990 | Likei |
| 5,362,084 | A | 11/1994 | Edwards |
| 5,732,967 | A | 3/1998 | Behling |
| 5,967,539 | A | 10/1999 | Digman |
| 6,168,182 | B1 | 1/2001 | Ford |
| 6,179,317 | B1 | 1/2001 | Hurst et al. |
| 6,279,939 | B1 | 8/2001 | Austin |
| 6,443,474 | B1 | 9/2002 | Kay |
| 6,572,132 | B1 | 6/2003 | Saul |
| 6,581,952 | B1 | 6/2003 | Mackarvich |
| 6,752,412 | B2 | 6/2004 | Saul |
| 6,971,661 | B1 | 12/2005 | Mackarvich |
| 7,267,354 | B2 | 9/2007 | Cunningham et al. |
| 7,845,669 | B2 | 12/2010 | Yeh et al. |
| 7,963,543 | B2 | 6/2011 | Green |
| 9,079,465 | B1 | 7/2015 | Sanftleben et al. |
| 9,855,804 | B1 | 1/2018 | Kirkconnell |
| 9,963,079 | B2 | 5/2018 | Hack et al. |
| 10,703,150 | B2 | 7/2020 | Smith |
| 10,766,319 | B2 | 9/2020 | Hack |
| 2003/0214115 | A1 | 11/2003 | Saul |
| 2005/0039309 | A1 | 2/2005 | McCauley et al. |
| 2015/0306930 | A1 | 10/2015 | Olson |
| 2020/0254834 | A1 | 8/2020 | Rasset et al. |
| 2022/0203785 | A1 | 6/2022 | Ward |

* cited by examiner 51
34
24
33
6
51
20
6

3
58
501
14
8

56
51
520

FIG. 10B
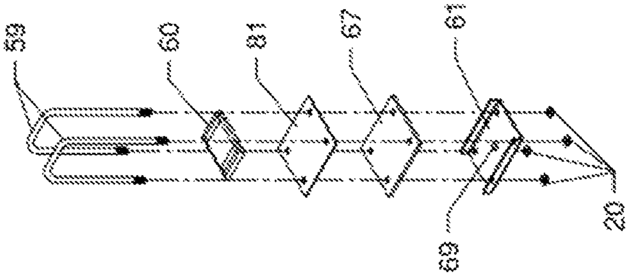
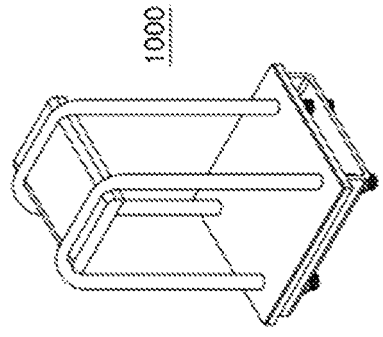
FIG. 10A

FIG. 10D
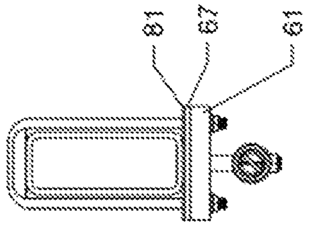
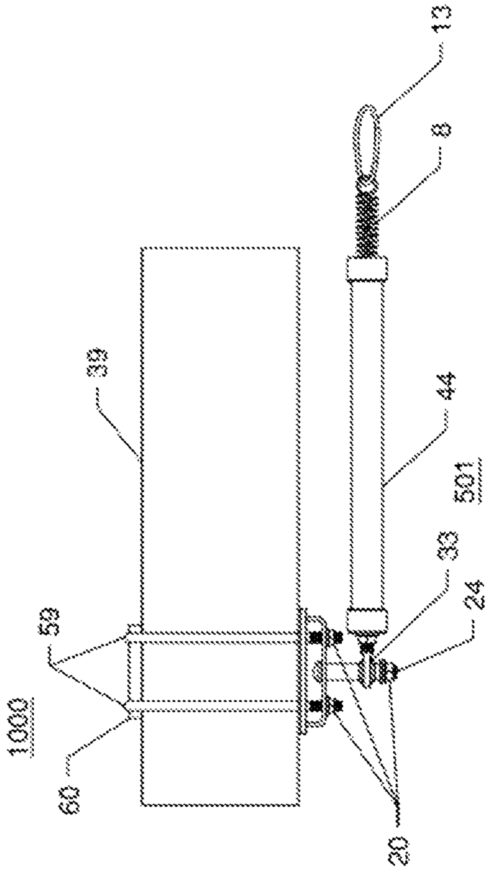
FIG. 10C

FIG. 11B
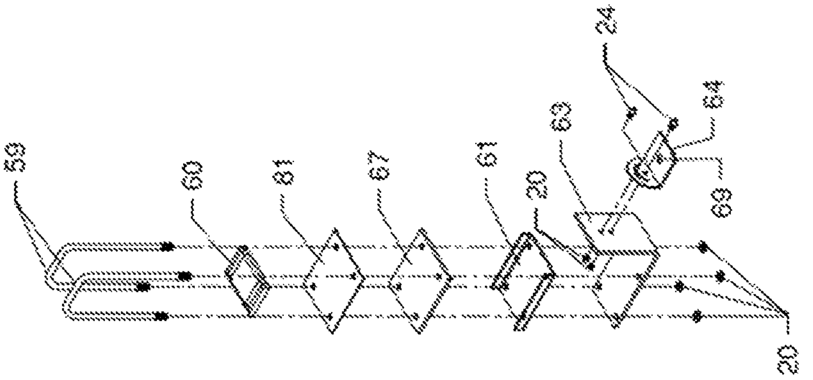
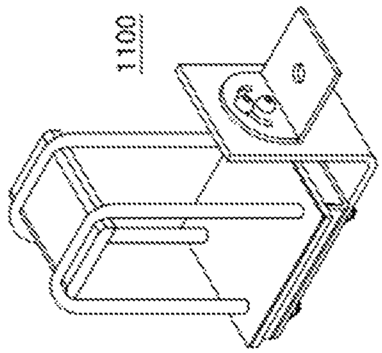
FIG. 11A

TRAILER CHAIN TENSIONING SYSTEM

BACKGROUND

One of the fastest growing types of vehicles on the road are towed vehicles, e.g., trailers. Today trailers come in a huge variety of types for an almost infinite number of uses. Types of trailers in use today include, but are not limited to, moving trailers, camping related/tent trailers, vehicle trailers, "toy" trailers, work related/tool trailers, open trailers, enclosed trailers, RVs, and numerous other types of professional, recreational, work, and moving related trailers.

Some, if not most, trailers are towed by towing vehicles that include special mounts called trailer hitches. Trailer hitches are typically inserted into two vehicle receivers and include a ball, or other, mount to attach a trailer tongue to the towing vehicle. The trailer tongue is typically part of a trailer frame and includes a coupler that typically sits on, and is locked down on, the towing vehicle trailer hitch.

FIG. 1A shows a typical tow vehicle 70 with tow vehicle receiver 43, vehicle hitch 42, hitch ball 71, trailer tongue jack 72, receiver hitch pin 73, distal chain attachment points 46, and safety chains 38. Of note is the fact that two safety chains 38 are shown in FIG. 1A for simplicity and clarity. However, in some cases a single safety chain, or two or more safety chains, such as safety chains 38, are commonly used.

Also shown in FIG. 1A is a portion of a typical trailer frame 39 of a trailer 92 with trailer tongue 40 and trailer coupler 41. As seen in FIG. 1A, trailer frame 39 also includes proximal trailer safety chain attachment points 47.

As seen in FIG. 1A, safety chains 38 are attached at a first, or distal end, to distal chain attachment points 46 and at a second, or proximal end, to proximal trailer safety chain attachment points 47. The purpose of safety chains, such as safety chains 38, is to provide a temporary back up system to keep trailer frame 39, and therefore the trailer 92, coupled to towing vehicle receiver 43, and therefore the towing vehicle, in case trailer coupler 41 disconnects from vehicle hitch 42 and/or vehicle receiver 43. In the event of such a trailer coupler 41/vehicle hitch 42 detachment, the safety chains, such as safety chains 38, temporarily keep the trailer 92 and towing vehicle 70 attached at least until the driver can pull off the road. Consequently, safety chains, such as safety chains 38, are a critical safety feature used on virtually all standard hitch towing systems.

While safety chains, such as safety chain 38 are indeed a critical safety feature, typically required by law, the safety chains themselves can present several types of hazards. One reason for these safety chain hazards is that the safety chains must be made long enough to adapt to different towing vehicles, trailers, and situations. Therefore, they are often of a length that is longer than actually needed in a given towing situation. this, in turn, means that there is often significant slack in the safety chains once they are connected. Referring back to FIG. 1A, shown is slack portions 80 of safety chains 38. As seen in FIG. 1A, slack portions 80 of safety chains 38 makes contact with ground surface 90. Consequently, slack portions 80 of safety chain 38 can drag along the ground as tow vehicle 70 is moving down the road. This represents a serious problem for several reasons.

Dragging safety chains represent a significant fire hazard because the dragging safety chains create sparks as they drag along the ground and heat up due to friction. As a result, dragging safety chains are a significant cause of roadside and off-road fires. Second, as the safety chains drag and bounce along the road, pieces of the safety chains can break off. This causes a hazard in the form of flying debris/chain pieces and also represents a tire hazard for other vehicles behind and/or that come down the road after the towing vehicle. In addition, dragging safety chains create a distraction to other drivers.

For these and other reasons, it is highly desirable to eliminate the risk of dragging safety chains. In the prior art several methods have been tried to "fix" the dragging safety chain problem. In some cases, drivers have simply wrapped or twisted the safety chains to eliminate slack in the safety chains. However, this method significantly weakens the safety chains, up to 50%. Consequently, the wrapped safety chains may no longer provide an effective safety back up function, i.e., the wrapped or twisted safety chains are no longer viable as a back-up system for keeping the trailer and towing vehicle attached until the driver can pull off the road.

In other cases, people have used rope, wire, elastic cords, and/or bungee cords and the like to try and stabilize the safety chains and temporarily adjust their length to eliminate slack. However, these devices have proven ineffective and inconsistent in their ability to maintain the desired length of safety chain and take up the slack.

FIG. 1B shows an elastic cord 75 used on the slack portions 80 of safety chains 38 of FIG. 1A in an attempt to secure slack portions 80 of safety chains 38 and keep slack portions 80 from contacting surface 90.

FIG. 1C shows a close up of region 91 of FIG. 1B including more detail of an elastic cord 75 used on the slack portions 80 of safety chains 38 of FIG. 1A in an attempt to secure slack portions 80 of safety chains 38 and keep slack portions 80 from contacting surface 90.

As a result of the shortcomings of prior art systems, safety chains still present serious dragging hazards that often outweigh, at least statistically, the safety features provided by the safety chains.

What is needed is a method and system that provides the ability to effectively and dynamically/automatically adjust the length of safety chains in a reliable and consistent manner so that the very important safety features provided by safety chains are not accompanied by the significant road hazard of dragging safety chain slack along the road.

SUMMARY

Embodiments of the present disclosure provide a technical solution to the long-standing technical problem of providing a method and system for effectively and dynamically securing safety chains in a reliable and consistent manner that reduces the slack portion and thereby eliminates the safety chain slack dragging issue.

To this end, the disclosed embodiments include safety chain tensioners with a tensioning element, such as a bare spring, tension spring, compression spring, rotary spring, etc., and mounting systems. In various embodiments, a first end, or proximal end, of the disclosed safety chain tensioner is connected to a safety chain. The safety chain is also connected to the towing vehicle, typically the towing hitch of the towing vehicle. A second end, or distal end, of the safety chain tensioner is connected to one of disclosed mounting systems. The mounting system is, in turn, attached to the trailer to be towed, typically to a frame of the trailer to be towed.

In various embodiments, the safety chain tensioner includes a tensioning element, such as a tension, compression, or rotary spring, that keeps a relatively constant, and dynamically/automatically adjustable, tension on the safety chain such that even when the towing vehicle and trailer are in motion, and even when the distance between the towing vehicle and trailer changes, any potential slack in the safety chains is automatically taken up by the relatively constant, and dynamically/automatically adjustable, tension on the safety chain provided by the safety chain tensioner.

Consequently, using the disclosed embodiments, the critical advantageous features of safety chains, such as providing an emergency linkage if the trailer is unhitched from the towing vehicle, are provided while avoiding the potential prior art hazards presented by slack in the safety chains once they are connected. Thus, using the disclosed embodiments, slack in the safety chains is all but eliminated by a relatively constant and dynamically/automatically adjustable tension provided to the safety chains by the disclosed tensioner and mounting systems. Consequently, using the disclosed embodiments, safety chains no longer drag along the ground as the vehicle is moving down the road. This represents a significant safety improvement over prior art systems.

For instance, using the disclosed embodiments, even when the towing vehicle and trailer are in motion, and even when the distance between the towing vehicle and trailer changes, the safety chain slack is automatically taken up and there is no significant safety chain slack to drag along the ground and create sparks and friction. Consequently, the significant fire hazard represented by dragging safety chain slack is virtually eliminated.

In addition, using the disclosed embodiments, there is no significant safety chain slack to drag along the ground and therefore pieces of the safety chains are not subject to breaking off. Consequently, the hazards in the form of flying debris, tire hazards for other vehicles, and driver distractions, are all but eliminated using the disclosed embodiments.

In addition, unlike prior art improvised methods including wrapping or folding safety chains to eliminate slack in the chains, the disclosed embodiments do not weaken the safety chains or interfere with their ability to provide the back-up safety linkage they are designed to provide.

In addition, unlike prior art improvised methods including elastic cords and/or bungee cords to eliminate slack in the safety chains, the disclosed embodiments are highly effective, dynamic, automatic, efficient, and consistent in their ability to maintain the desired length of the safety chain and take up the slack.

Therefore, the disclosed embodiments provide the ability to effectively, dynamically, and automatically adjust the length of safety chains in a reliable and consistent manner even when the towing vehicle and trailer are in motion, and even when the distance between the towing vehicle and trailer changes. In this way, the disclosed embodiments provide a technical solution to the long-standing technical problem of providing a method and system for effectively and dynamically securing safety chains in a reliable and consistent manner that reduces the slack portion and thereby eliminates the safety chain slack issue.

BRIEF DESCRIPTION OF THE DRAWINGS

Common reference numerals are used throughout the figures and the detailed description to indicate like elements. One skilled in the art will readily recognize that the above figures (FIG's.) are merely illustrative examples and that other structures, modes of operation and function, orders of operation and function, and elements/functions can be provided and implemented without departing from the characteristics and features of the invention, as set forth in the claims.

FIG. 3I shows a telescoping articulating tensioner of FIGS. 3F, 3G, and 3H mounted to a trailer with safety chains using a swivel clamp mount and a trailer hitch in accordance with one embodiment.

FIG. 3O shows various views and components of one embodiment of a safety release in accordance with one embodiment.

FIG. 10A shows a U bracket in accordance with one embodiment.

FIG. 10B shows the parts of the U bracket of FIG. 10A, in accordance with one embodiment.

FIG. 10C shows a side view of a U bracket and ball joint mount used with an open ended tensioner, in accordance with one embodiment.

FIG. 10D shows a front view of a U bracket and ball joint mount in accordance with one embodiment.

FIG. 11A shows a U frame adjustable mounting bracket in accordance with one embodiment.

FIG. 11B shows the parts of the U frame adjustable mounting bracket of FIG. 11A, in accordance with one embodiment.

DETAILED DESCRIPTION

Embodiments will now be discussed with reference to the accompanying figures (FIGs.), which depict one or more exemplary embodiments. Embodiments may be implemented in many different forms and should not be construed as limited to the embodiments set forth herein, shown in the FIGs., or described below. Rather, these exemplary embodiments are provided to allow a complete disclosure that conveys the principles of the invention to those of skill in the art.

Embodiments of the present disclosure provide a technical solution to the long-standing technical problem of providing a method and system for effectively and dynamically securing safety chains in a reliable and consistent manner that reduces the slack portion and thereby eliminates the safety chain slack issue.

In various embodiments, a safety chain tensioner and mounting system includes a safety chain tensioner that keeps a relatively constant, and dynamically/automatically adjustable, tension on the safety chain such that, even when a towing vehicle and trailer are moving down the road, and the distance between the towing vehicle and trailer varies or is adjusted, any potential slack in the safety chains is automatically taken up by the relatively constant, and dynamically/automatically adjustable, tension on the safety chain provided by the safety chain tensioner. In one embodiment, a first end of the safety chain tensioner is connected to a safety chain and second end is connected to one of disclosed mounting systems. In one embodiment, the mounting system is, in turn, attached to the trailer to be towed, typically to a frame and/or tongue of the trailer to be towed.

Therefore, the disclosed embodiments provide the ability to effectively, dynamically, and automatically adjust the length of safety chains in a reliable and consistent manner even when a towing vehicle and trailer are moving down the road and the distance between the towing vehicle and trailer varies or is adjusted. In this way, the disclosed embodiments provide a technical solution to the long-standing technical problem of providing a method and system for effectively and dynamically securing safety chains in a reliable and consistent manner that reduces the slack portion and thereby eliminates the safety chain slack issues.

Figure 2A:
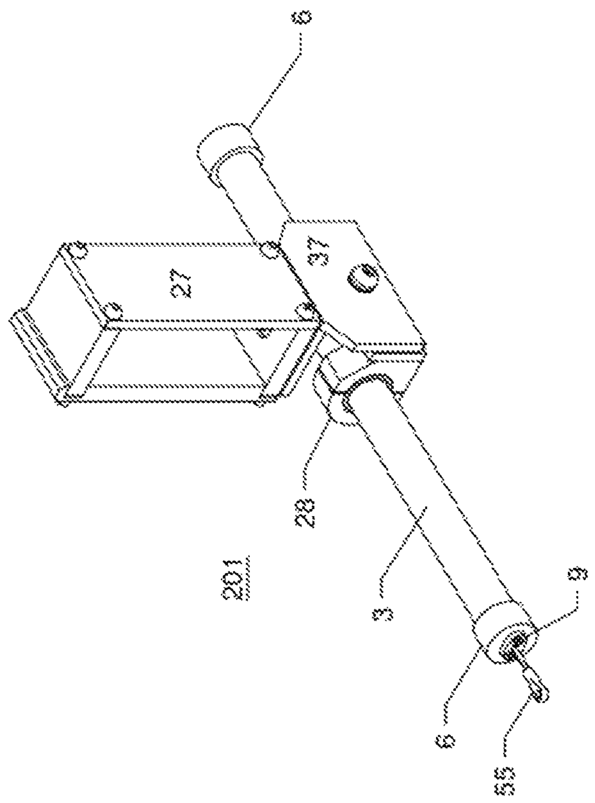
FIG. 2A shows an articulating spring tensioner including a tension element, e.g., either a tension or compression spring, and a wire rope cable with a swivel clamp mount in accordance with one embodiment.

FIG. 2A shows an articulating spring tensioner 201 and an articulating tensioner clamp mount assembly 27 in accordance with one embodiment.

As seen in FIG. 2A, in one embodiment, articulating spring tensioner 201 includes tube 3 with tube caps 6 mounted in tube clamp 28 which is attached to articulating tensioner clamp mount assembly 27 via swivel bracket 37. As also seen in FIG. 2A, in one embodiment, articulating spring tensioner 201 includes dust seal 9 and chain attachment eye 55 connected to wire rope cable 56 (see FIG. 2B).

Figure 2B:
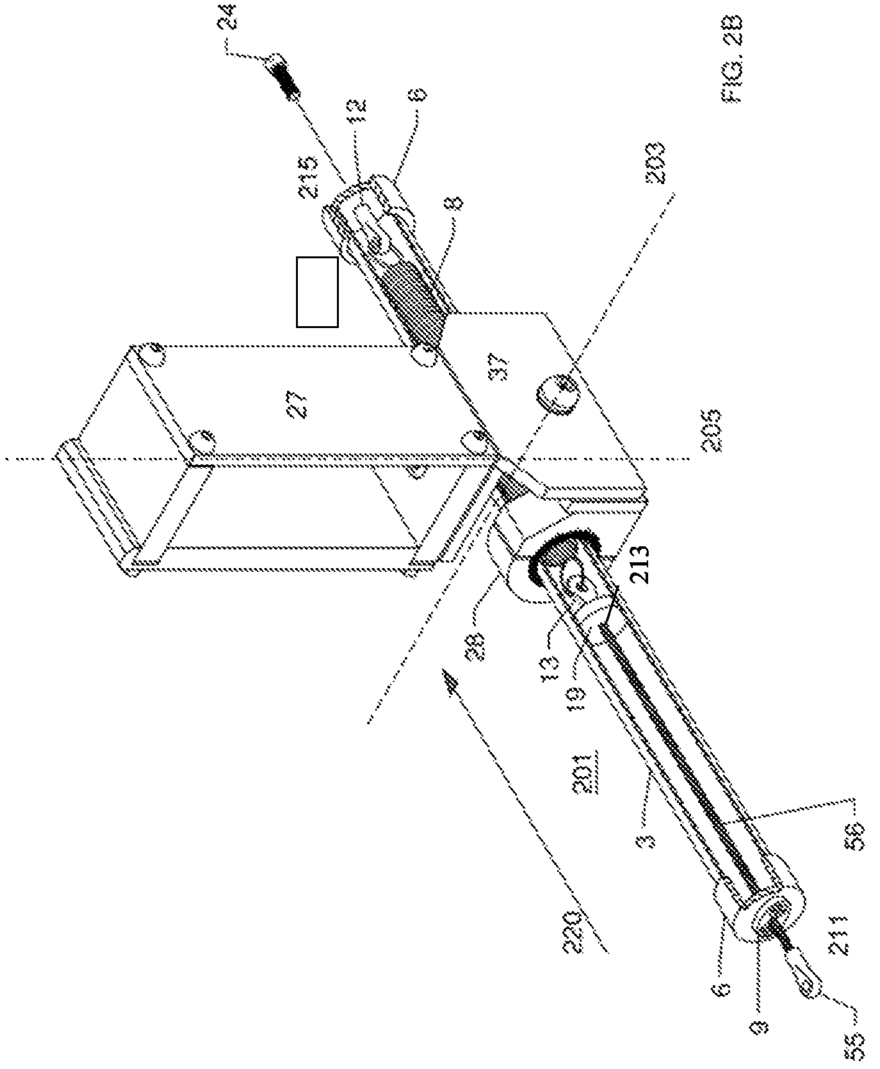
FIG. 2B shows a cutaway view of the articulating spring tensioner including a tension spring, a wire rope cable, and a swivel clamp mount in accordance with one embodiment.

FIG. 2B shows a cutaway view of the articulating spring tensioner 201 that includes more details of the inner workings of one embodiment of articulating spring tensioner 201, including a tension spring 8 and wire rope cable 56.

As seen in FIG. 2B, in one embodiment, chain attachment eye 55 is connected to a first, or distal, end 211 of wire rope cable 56. In one embodiment, a second, or proximal end 213 of wire rope cable 56 is connected to, or through, a glide 19, such as a nylon glide, and attached to a proximal spring attachment point eye 13. In one embodiment, a first, or distal, end of tension spring 8 is attached to spring attachment point eye 13 and a second, or proximal end, of tension spring 8 is attached to proximal spring attachment point eye 12. In one embodiment, proximal spring attachment point eye 12 is held in place against tube cap 6 with bolt 24 at proximal end 215 of tube 3.

As a result of the connections discussed above, a relatively constant tension is maintained at chain attachment eye 55 in direction 220 by tension spring 8. Thus, as discussed in more detail below, when chain attachment eye 55 is connected to a safety chain that relatively constant tension is maintained on the safety chain at the point of attachment.

As also discussed in more detail below, in one embodiment, articulating tensioner clamp mount assembly 27 and swivel bracket 37 include bearings (not shown in FIG. 2B, see FIGS. 3H, 8B, and 9B, elements 15) that allow for rotation around horizontal axis 203 and vertical axis 205. As a result of this structure, articulating spring tensioner 201 is free to move at these pivot points to adapt to different forces and force directions. This allows articulating spring tensioner 201 to maintain a more constant steady force and prevents damage to articulating spring tensioner 201 as the towing vehicle and trailer move down the road and encounter varying road conditions, including but not limited to, uneven roads.

Figure 1A:
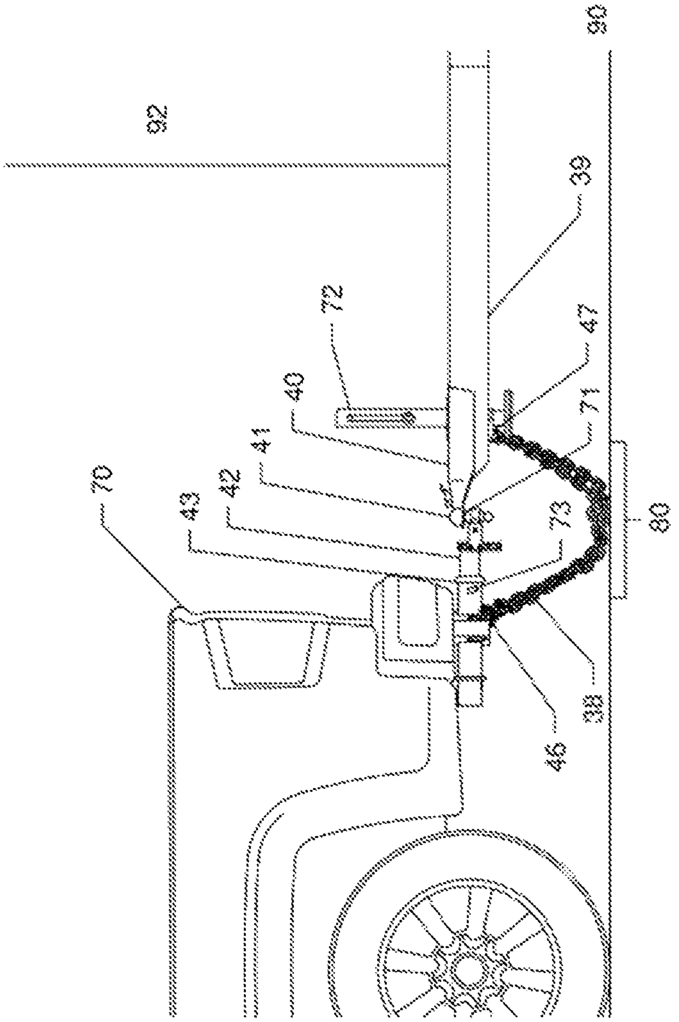
FIG. 1A (PRIOR ART)
FIG. 1A shows a typical prior art towing vehicle receiver with vehicle hitch, distal chain attachment points, and a portion of a typical trailer frame with trailer tongue, trailer coupler, and proximal trailer safety chain attachment points, as well as safety chains.
Figure 1B:
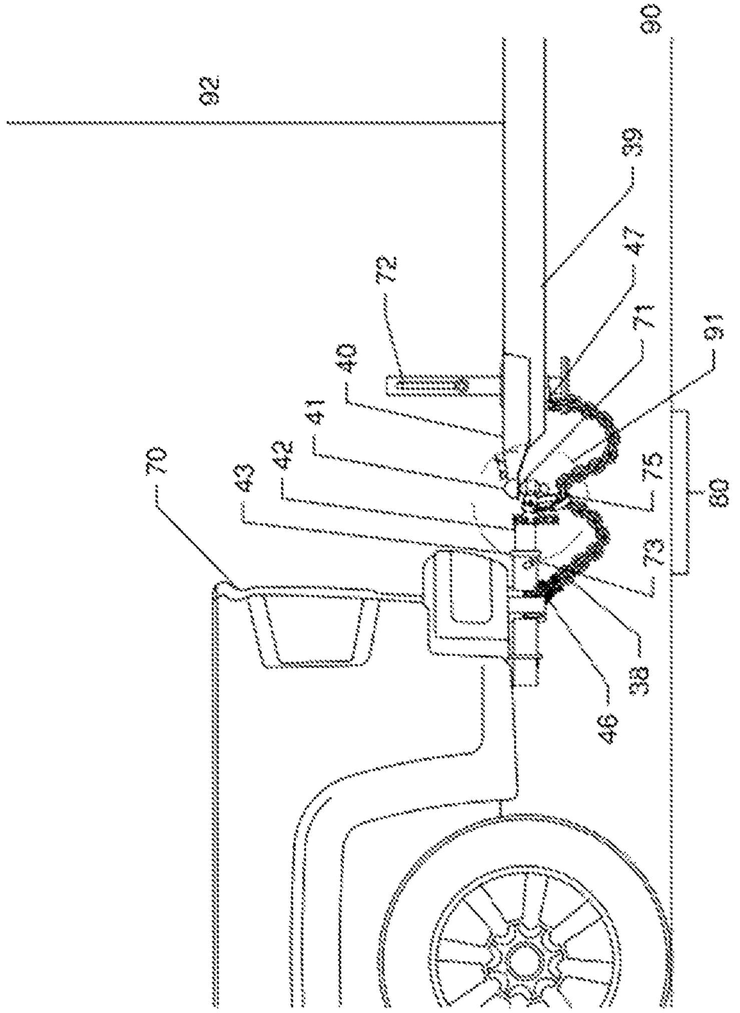
FIG. 1B (PRIOR ART)
FIG. 1B shows an elastic cord used on the slack portions of safety chains of FIG. 1A in an attempt to secure the slack portions of the safety chains and keep the slack portions from contacting the ground.
Figure 1C:
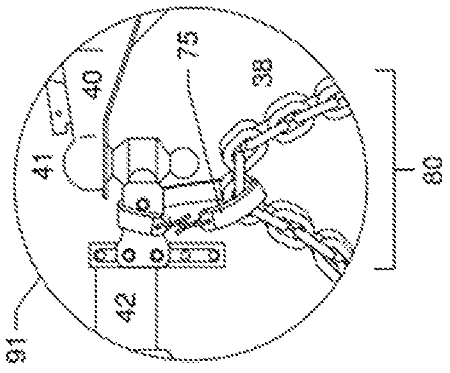
FIG. 1C (PRIOR ART)
FIG. 1C shows a close up of an elastic cord used in the prior art on the slack portions of safety chains of FIG. 1A in an attempt to secure the slack portions of the safety chains and keep the slack portions from contacting the ground.

In addition, as a result of the connections discussed above, a relatively constant tension is maintained even as the towing vehicle and trailer turn. Referring back to FIG. 1A, in the prior art, absent the disclosed embodiments, when two sets of safety chains 38 are used, one on each side of the towing trailer tongue, when a turn was made, one set of safety chains 38 would have extra tension, and little of no slack, while the other set would have even more slack, and more chance of dragging. However, as seen in FIGS. 2A and 2B, using the disclosed embodiments, a relatively constant tension is maintained at the slack elimination point, thus, when chain attachment point is connected to a safety chain 38 that relatively constant tension is maintained on safety chain 38 at the slack elimination point and thereby prevents slack from forming in safety chains 38; keeping safety chains 38 taught and above the ground surface even as the towing vehicle and trailer are turning.

Figure 2C:
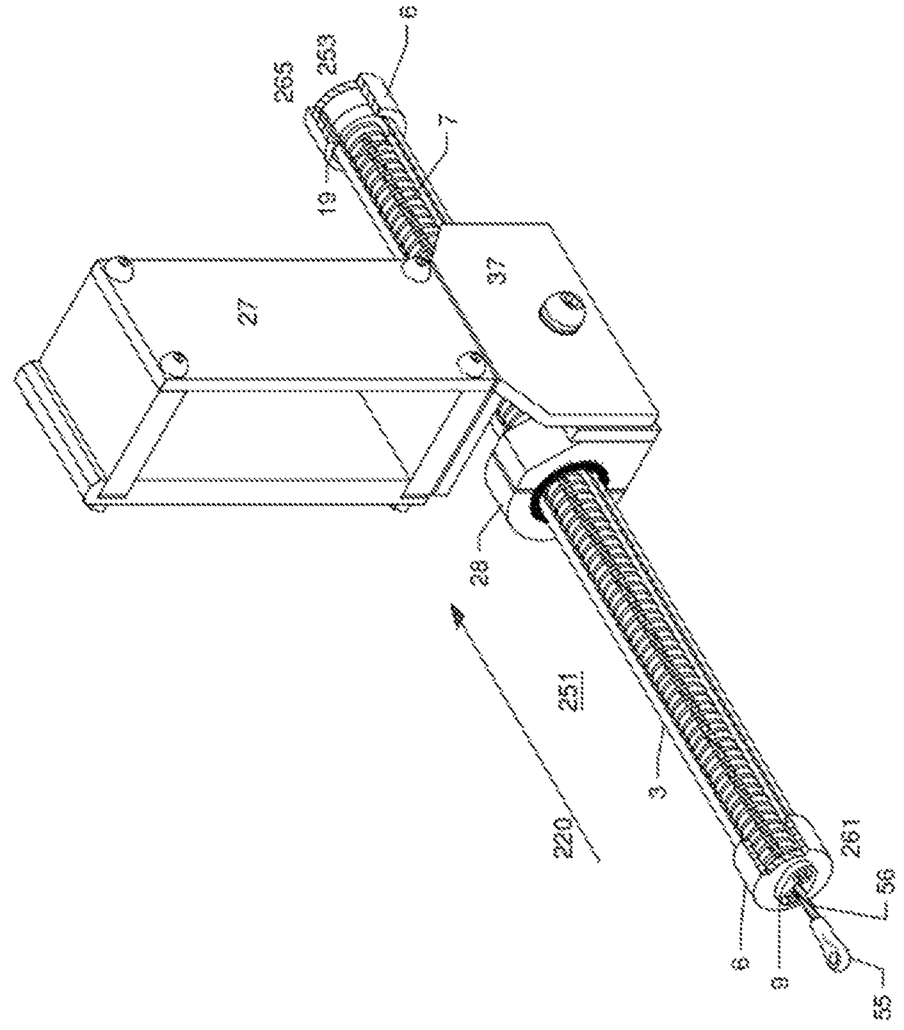
FIG. 2C shows a cutaway view of an articulating spring tensioner including a compression spring and wire rope cable and a swivel clamp mount in accordance with one embodiment.

FIG. 2C shows a cutaway view of the articulating spring tensioner 251 that includes more details of the inner workings of an embodiment of articulating spring tensioner 251 including a compression spring 7 and wire rope cable 56 running down a centerline of the compression spring 7.

As seen in FIG. 2C, in one embodiment, chain attachment eye 55 is connected to a first, or distal, end 261 of wire rope cable 56. In one embodiment, a second, or proximal end 265 of wire rope cable 56 is connected to a glide 19, such as a nylon glide, and a proximal spring attachment/seating point 253. In one embodiment, a first, or distal end, of compression spring 7 rests against an inner surface of cap 6 which maintains compression spring 7 in place and provides a stop for compression spring 7. In one embodiment, a second, or proximal end, of compression spring 7 rests against glide 19 and an inner surface of cap 6 at the other end of tube 3 which maintains compression spring 7 in place and provides a stop for compression spring 7.

As a result of the connections discussed above, a relatively constant tension is maintained at chain attachment eye 55 in direction 220 by compression spring 7. Thus, as discussed in more detail below, when chain attachment eye 55 is connected to a safety chain a relatively constant tension is maintained on the safety chain even as the towing vehicle and trailer move down the road and encounter varying road conditions, including but not limited to, uneven roads.

As also discussed in more detail below, in one embodiment, articulating tensioner clamp mount assembly 27 and swivel bracket 37 include bearings (not shown in FIG. 2C, see FIGS. 3H, 8B, and 9B, elements 15) that allow for rotation around horizontal axis 203 and vertical axis 205 (FIG. 2B). As a result of this structure, articulating spring tensioner 201 is free to move at these pivot points to adapt to different forces and force directions. This allows articulating spring tensioner 201 to maintain a more constant steady force and prevents damage to articulating spring tensioner 201 as the towing vehicle and trailer move down the road and encounter varying road conditions, including but not limited to, uneven roads.

Figure 2D:
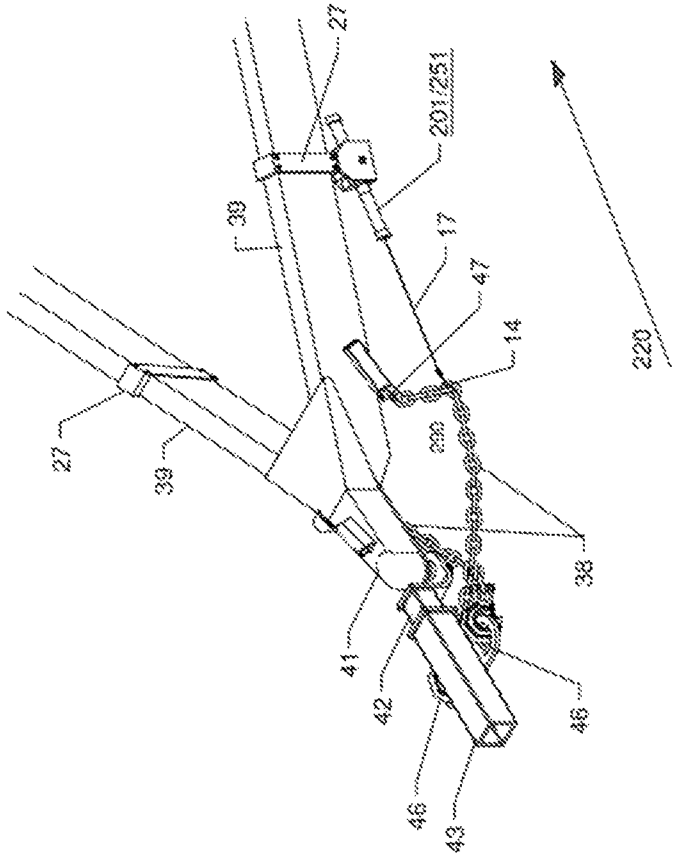
FIG. 2D shows the articulating spring tensioner of FIG. 2A, 2B, or 2C mounted to a trailer using a swivel clamp mount and a trailer hitch as well as safety chains in accordance with one embodiment.

FIG. 2D shows the articulating spring tensioner 201 or 251 of FIG. 2A, 2B, or 2C mounted to a trailer frame 39 by articulating tensioner clamp mount assembly 27 in accordance with one embodiment. FIG. 2D also shows towing vehicle receiver 43 with distal trailer safety chain attachment points 46, vehicle hitch 42 and trailer coupler 41.

As shown in FIG. 2D, in one embodiment, trailer safety chains 38 have distal ends attached to distal trailer safety chain attachment points 46 and proximal end attached to chain attachment hook points 47. As discussed above, safety chains 38 are used as a back-up safety mechanism to provide a temporary connection in case the trailer coupler 41 detaches from the vehicle hitch 42. In the event of such a coupler/hitch detachment, the safety chains 38 keep the trailer and towing vehicle attached at least until the driver can pull off the road. Consequently, safety chains 38 are a critical safety feature used on virtually all standard hitch towing systems.

However, as also discussed above, while safety chains 38 are a critical safety feature, typically required by law, the safety chains 38 themselves can present several other types of hazards. This is because the safety chains 38 must be made long enough to adapt to different towing vehicles, trailers, and situations, so there is often significant slack in the safety chains 38 once they are connected. This slack means that the safety chains 38 can drag along the ground as the vehicle is moving down the road. This represents a serious problem for several reasons.

First dragging safety chains 38 represent a significant fire hazard because dragging safety chains 38 create sparks and heat up due to friction. As a result, dragging safety chains 38 are a significant cause of roadside and off-road fires. Second, as the safety chains 38 drag and bounce along the road, pieces of the safety chains 38 can break off. This weakens the chains and causes a hazard in the form of flying debris/chain pieces and also represents a tire hazard for other vehicles behind and/or that come down the road after the towing vehicle. In addition, dragging safety chains 38 create a distraction to other drivers. For these and other reasons, it is highly desirable to eliminate the risk of dragging safety chains 38.

To this end, referring to FIGS. 2A, 2B, 2C and 2D, in one embodiment, the articulating spring tensioners 201 or 251 are first coupled to trailer frame 39 by, in this example, articulating tensioner clamp mount assembly 27. As discussed above, in one embodiment, articulating tensioner clamp mount assembly 27 and swivel bracket 37 include bearings (not shown in FIG. 2B, see FIGS. 3H, 8B, and 9B, element 15) that allow for rotation around horizontal axis 203 and vertical axis 205 (FIG. 2B). As a result of this structure, articulating spring tensioners 201 or 251 are free to move at these pivot points to adapt to different forces and force directions. This allows articulating spring tensioners 201 or 251 to maintain a more constant steady force and prevents damage to articulating spring tensioners 201 or 251 as the towing vehicle and trailer move down the road and encounter varying road conditions, including but not limited to, uneven roads.

In one embodiment, once articulating spring tensioners 201 or 251 are mounted, chain attachment eye 55 is connected to safety chains 38 at the area of slack, i.e., at slack elimination point 290.

As discussed above, in one embodiment, when articulating spring tensioners 201 are used, chain attachment eye 55 is connected to a first, or distal, end of wire rope cable 56. A second, or proximal end of wire rope cable 56 is connected to a glide 19, such as a nylon glide, with a distal spring attachment point eye 13. In one embodiment, a first, or distal, end of tension spring 8 is attached to spring attachment point eye 13 and a second, or proximal end, of tension spring 8 is attached to proximal spring attachment point eye 12. In one embodiment, proximal spring attachment point eye 12 is held in place against tube cap 6 with bolt 24.

As a result of the connections discussed above, a relatively constant tension is maintained at chain attachment eye 55 in direction 220 by tension spring 8 at slack elimination point 290. Thus, as discussed in more detail below, when chain attachment eye 55 is connected to a safety chain 38 that relatively constant tension is maintained on safety chain 38 at slack elimination point 290 and attachment point hook 14 in direction 220 and thereby prevents slack from forming in safety chains 38; keeping safety chains 38 taught and above the ground surface even as the towing vehicle and trailer move down the road and encounter varying road conditions, including but not limited to, uneven roads.

As also discussed above, in one embodiment, when articulating spring tensioners 251 are used, chain attachment eye 55 is also connected to a first, or distal, end of wire rope cable 56. A second, or proximal, end of wire rope cable 56 is connected to a glide 19, such as a nylon glide, with a distal spring attachment point/seat 253. In one embodiment, a first, or distal, end of compression spring 7 rests against an inner surface of cap 6 which maintains compression spring 7 and provides a stop for compression spring 7. In one embodiment, a second, or proximal end, of compression spring 7 rests against glide 19 and an inner surface of cap 6 at the other end of tube 3 which maintains compression spring 7 and provides a stop for compression spring 7.

As a result of the connections discussed above, a relatively constant tension is maintained at chain attachment eye 55 by compression spring 7 at attachment point hook 14 in direction 220. Thus, as discussed in more detail below, when chain attachment eye 55 is connected to a safety chain at slack elimination point 290 that relatively constant tension is maintained on the safety chain 38 at slack elimination point 290 and attachment point hook 14 in direction 220 and thereby prevents slack from forming in safety chains 38; keeping safety chains 38 taught and above the ground surface even as the towing vehicle and trailer move down the road and encounter varying road conditions, including but not limited to, uneven roads.

Figure 3A:
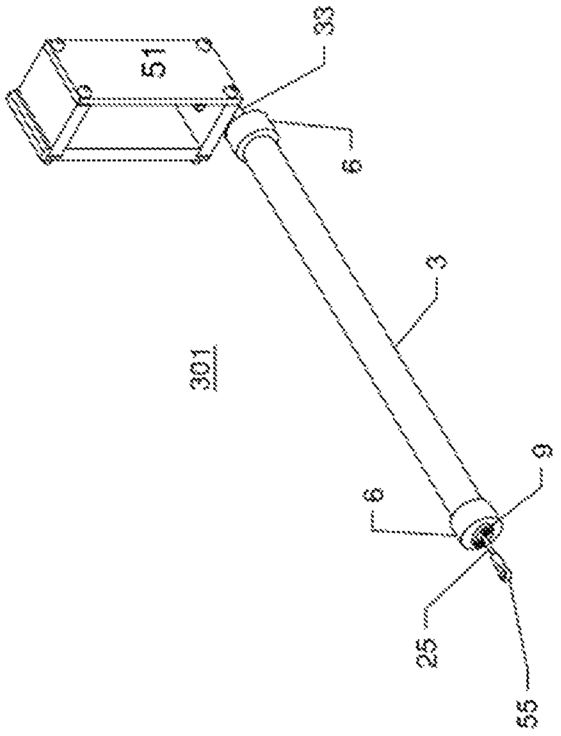
FIG. 3A shows a tensioner including a tension element, e.g., a tension spring or compression spring with steel rod with a ball joint clamp mount in accordance with one embodiment.

FIG. 3A shows a tensioner 301, including a tension spring and steel rod, and a ball joint clamp mount 51 in accordance with one embodiment.

As seen in FIG. 3A, in one embodiment, tensioner 301 includes tube 3 with tube caps 6 mounted to ball joint rod 33 which is attached to ball joint clamp mount 51. As also seen in FIG. 3A, in one embodiment, tensioner 301 includes dust seal 9 and chain attachment eye 55 connected to rod 25.

Figure 3B:
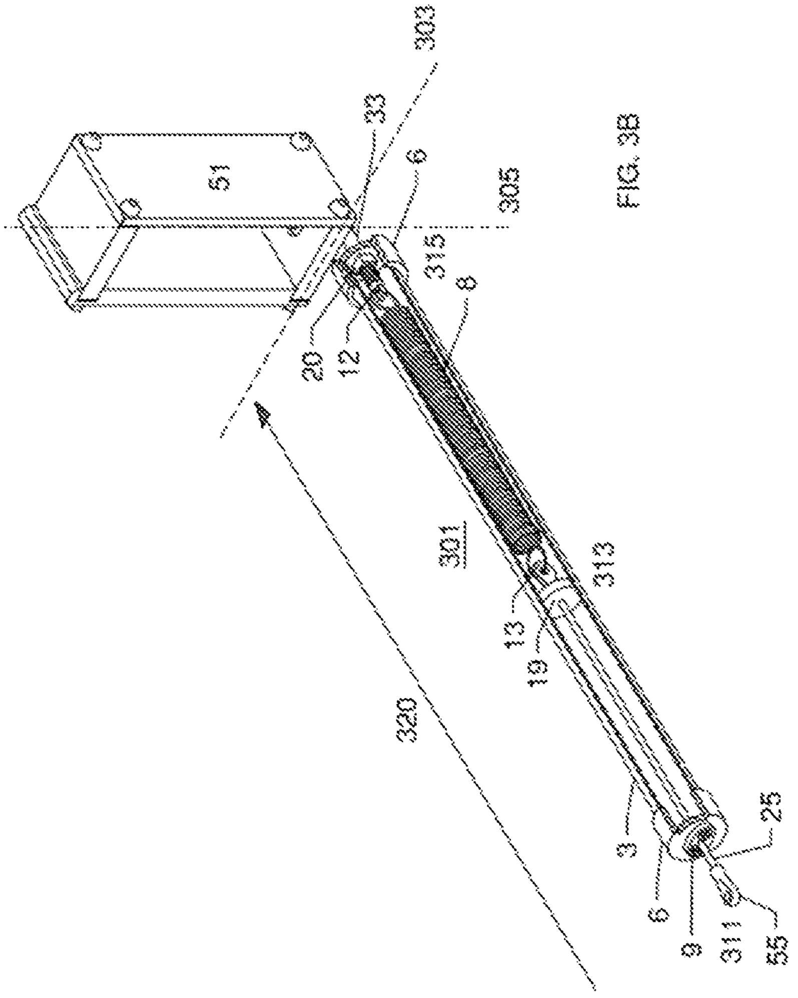
FIG. 3B shows a cutaway view of a tensioner including a tension spring and steel rod and a ball joint clamp mount in accordance with one embodiment.

FIG. 3B shows a cutaway view of tensioner 301 that includes more details of the inner workings of one embodiment of tensioner 301, including a tension spring 8 and rod 25.

As seen in FIG. 3B, in one embodiment, chain attachment eye 55 is connected to a first, or distal, end 311 of rod 25. In one embodiment, a second, or proximal end 313 of rod 25 is connected to, or through, a glide 19, such as a nylon glide, with a proximal spring attachment point eye 13. In one embodiment, a first, or distal, end of tension spring 8 is attached to spring attachment point eye 13 and a second, or proximal end, of tension spring 8 is attached to proximal spring attachment point eye 12. In one embodiment, proximal spring attachment point eye 12 is held in place and connected to ball joint rod 33 with nut 20 at proximal end 315 of tube 3.

As a result of the connections discussed above, a relatively constant tension is maintained at chain attachment eye 55 by tension spring 8 in the direction 320 from distal end 311 to proximal end 315. Thus, as discussed in more detail below, when chain attachment eye 55 is connected to a safety chain that relatively constant tension is maintained on the safety chain even as the towing vehicle and trailer move down the road and encounter varying road conditions, including but not limited to, uneven roads.

As also discussed in more detail below, in one embodiment, ball joint clamp mount 51 includes a ball joint ball (not shown in FIG. 3B see FIG. 3N, element 33 detail) that allows for movement around a horizontal axis 303 and vertical axis 305. As a result of this structure, tensioner 301 is relatively free to move to adapt to different forces and force directions. This allows tensioner 301 to maintain a more constant steady force and prevents damage to tensioner 301 even as the towing vehicle and trailer move down the road and encounter varying road conditions, including but not limited to, uneven roads.

Figure 3C:
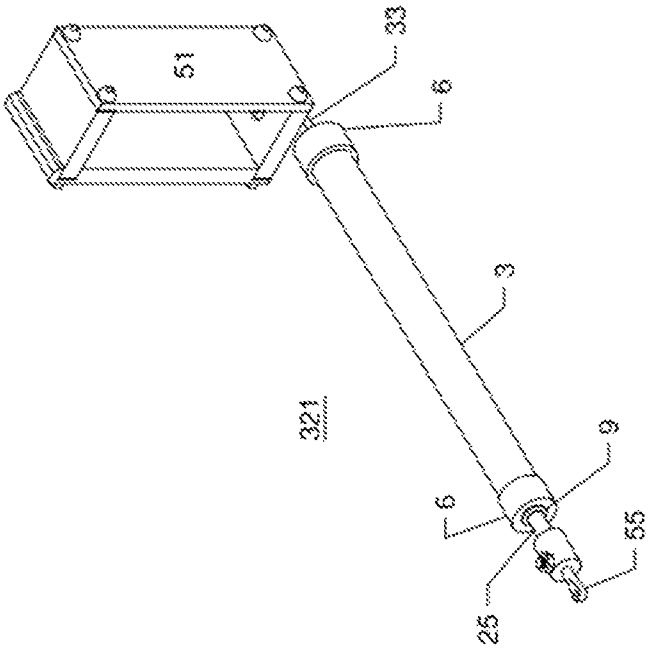
FIG. 3C shows a tensioner including a compression spring and steel rod and a ball joint clamp mount in accordance with one embodiment.

FIG. 3C shows a tensioner 321, including a compression spring and steel rod, and a ball joint clamp mount 51 in accordance with one embodiment.

As seen in FIG. 3C tensioner 321 includes tube 3 with tube caps 6 mounted to ball joint rod 33 which is attached to ball joint clamp mount 51. As also seen in FIG. 3C, in one embodiment, tensioner 321 includes dust seal 9 and chain attachment eye 55 connected to rod 25.

Figure 3D:
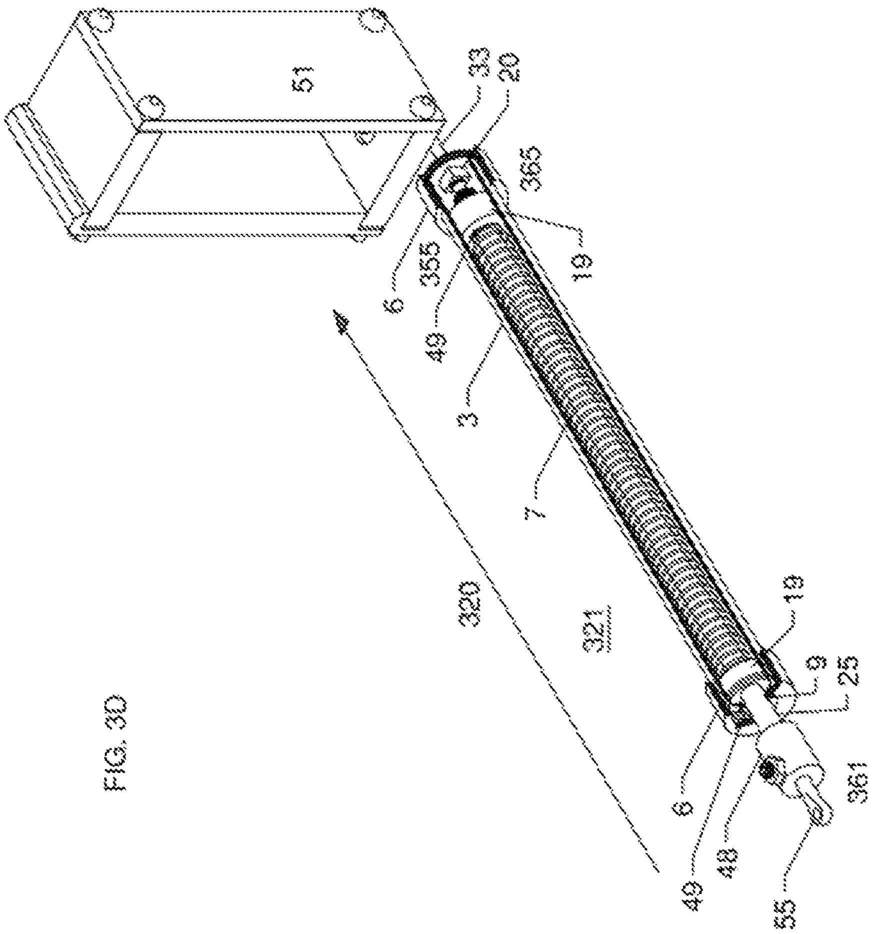
FIG. 3D shows a cut away view of a tensioner including a compression spring and steel rod and a ball joint clamp mount in accordance with one embodiment.

FIG. 3D shows a cutaway view of a tensioner 321 that includes more details of the inner workings of an embodiment of tensioner 321 including a compression spring 7 and rod 25 running down a centerline of the compression spring 7.

As seen in FIG. 3D, in one embodiment, chain attachment eye 55 is connected to a first, or distal, end 361 of rod 25 with circle clip 49. In one embodiment, a second, or proximal end 365 rod 25 is connected to, or through, a glide 19, such as a nylon glide, with circle clip 49 at proximal spring attachment point 355. In one embodiment, a first, or distal, end of compression spring 7 rests against an inner surface of cap 6 which maintains compression spring 7 in place with circle clip 49 and provides a stop for compression spring 7. In one embodiment, a second, or proximal end, of compression spring 7 rests against glide 19 and an inner surface of cap 6 at the other end of tube 3 which with circle clip 49 maintains compression spring 7 in place and provides a stop for compression spring 7.

In one embodiment, there is a safety release 48 at first, or distal, end 361 of rod 25 of tensioner 321. In one embodiment, safety release 48 serves to release rod 25 from rod eye 55 if a defined force, capable of damaging tensioner 321 is exerted. In one embodiment, safety release 48 disconnects the tensioner 321 from the safety chains 38 if the travel of slack elimination point 290 (see FIG. 3E) exceeds the travel ability of the tensioner 321 to prevent damage to tensioner 321, such as with a very long safety chain 38 chain, or if someone forgets to disconnect the safety chain 38 from the tow vehicle and pulled away from the trailer.

Figure 30:
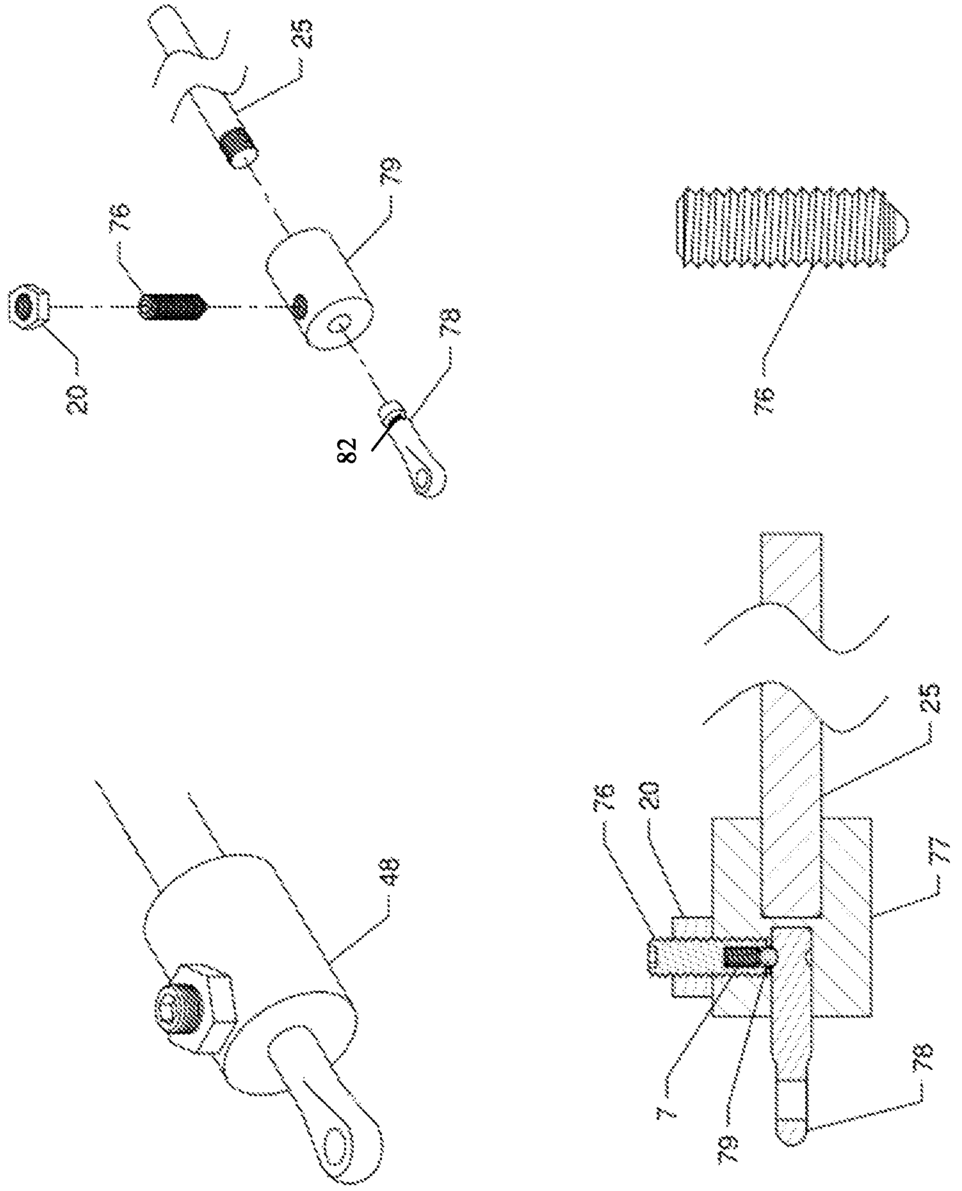

FIG. 3O shows various views and components of one embodiment of a safety release 48. As seen in FIG. 30 one illustrative example of a safety release 48 includes compression spring 7, nut 20, rod 25, spring plunger 76, safety release body 77, cable eye 78, and plunger ball 79. As seen in FIG. 3O, in one embodiment, cable eye 78 has a grove 82 in it which plunger ball 79 seats. In one embodiment, set screw 76 then enough pressure to withstand the tension of the safety chain 38 during normal forces but will release if those forces exceed the set tension that is set to prevent the tensioner from being damaged. In one embodiment, the shaft end 25 of the cylinder is threaded locking the shaft to the safety release body 77.

Figure 3E:
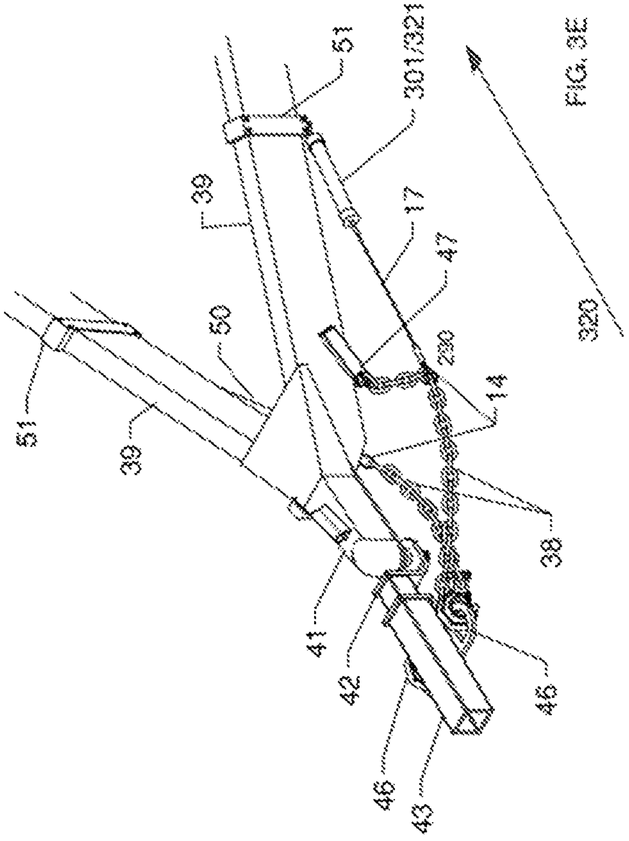
FIG. 3E shows the tensioner of FIG. 3A, 3B, 3C or 3D mounted to a trailer with safety chains using a ball joint clamp mount and a trailer hitch in accordance with one embodiment.
Figure 3F:
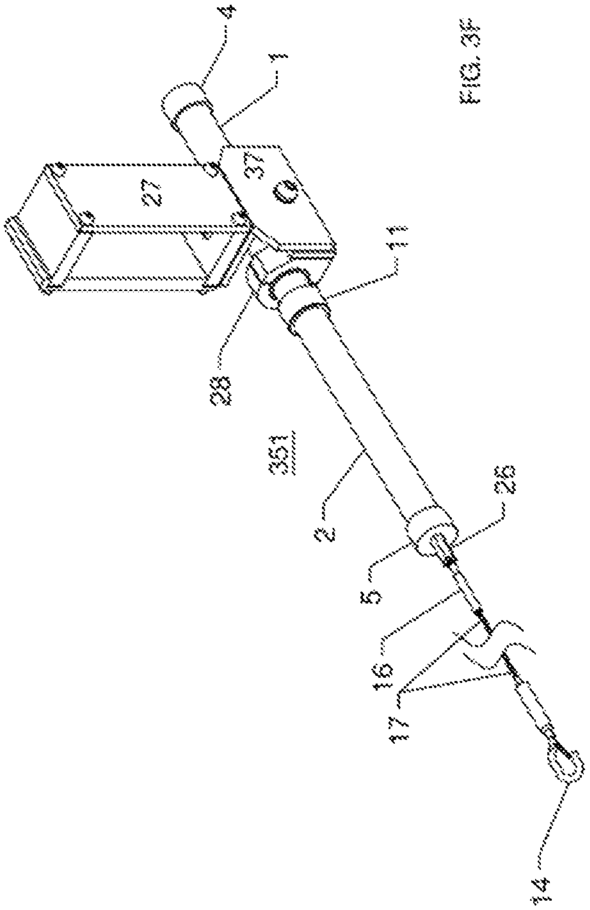
FIG. 3F shows a telescoping articulating tensioner with telescoping tube, tension spring, metal rod and swivel clamp mount in accordance with one embodiment.
Figure 3G:
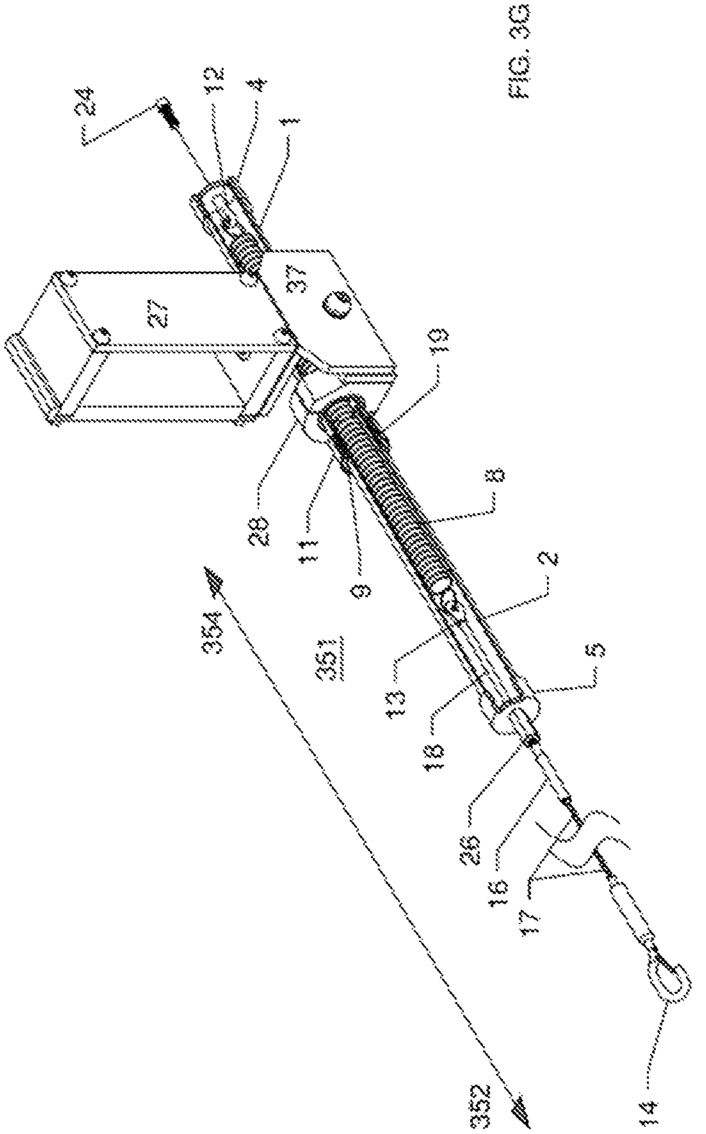
FIG. 3G shows a cutaway view of a telescoping articulating tensioner with telescoping tube, tension spring, metal rod and swivel clamp mount in accordance with one embodiment.
Figure 3H:
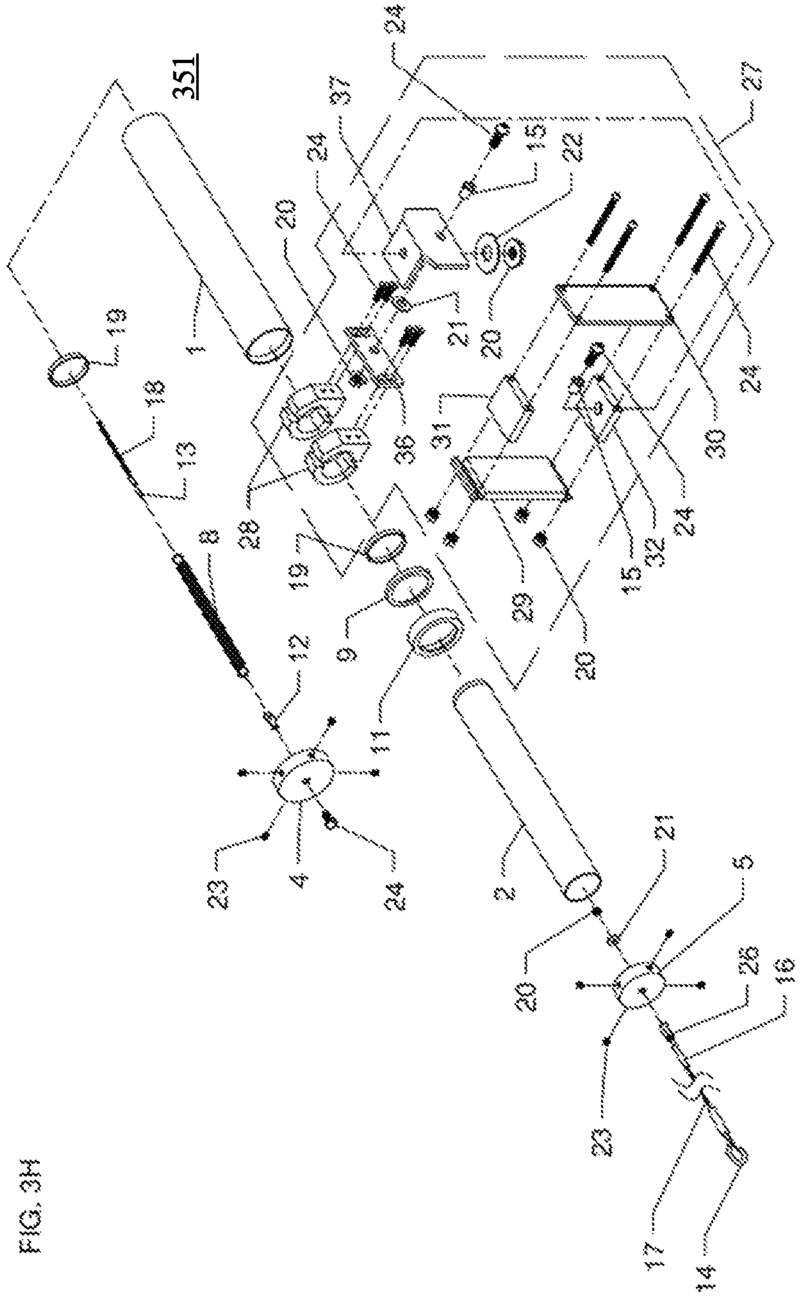
FIG. 3H shows an exploded view of the parts of a telescoping articulating tensioner with telescoping tube, tension spring, metal rod, and swivel clamp mount in accordance with one embodiment.
Figure 31:
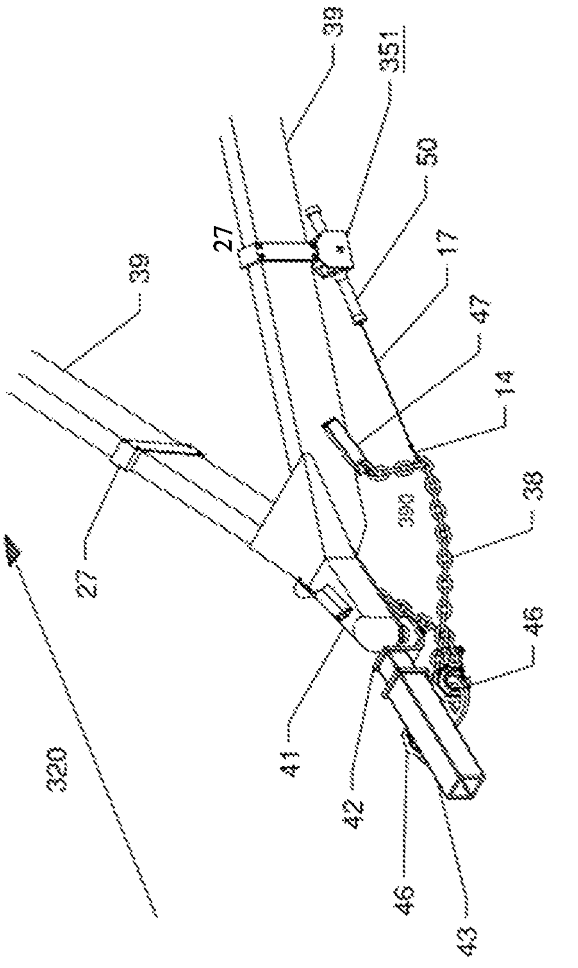
Figures 3J, 3K, 3L:
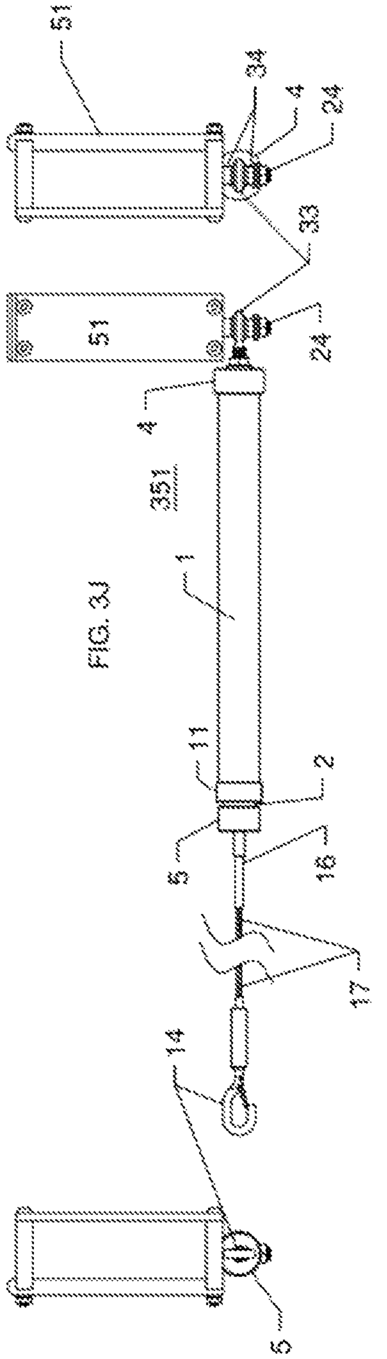
FIG. 3J shows a side view of a telescoping articulating tensioner with telescoping tube, tension spring, metal rod, and ball joint clamp mount in accordance with one embodiment.
FIG. 3K shows a front view of a telescoping articulating tensioner with telescoping tube, tension spring, metal rod, and ball joint clamp mount in accordance with one embodiment.
FIG. 3L shows a back view of a telescoping articulating tensioner with telescoping tube, tension spring, metal rod, and ball joint clamp mount in accordance with one embodiment.
Figure 3M:
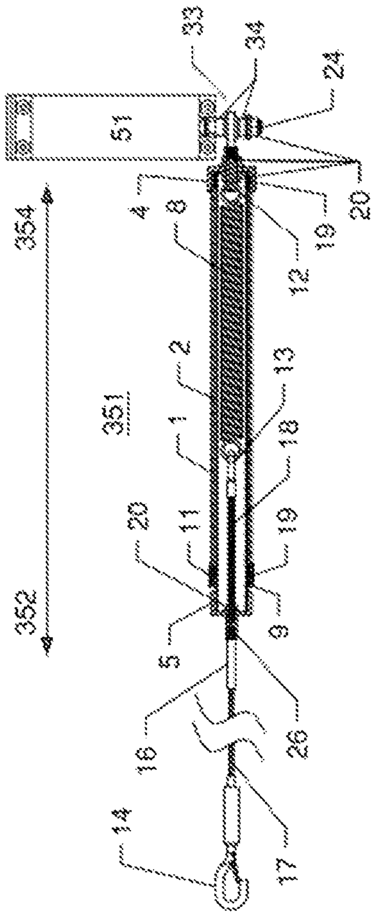
FIG. 3M shows a cutaway side view of a telescoping articulating tensioner with telescoping tube, tension spring, metal rod, and ball joint clamp mount in accordance with one embodiment.
Figure 3N:
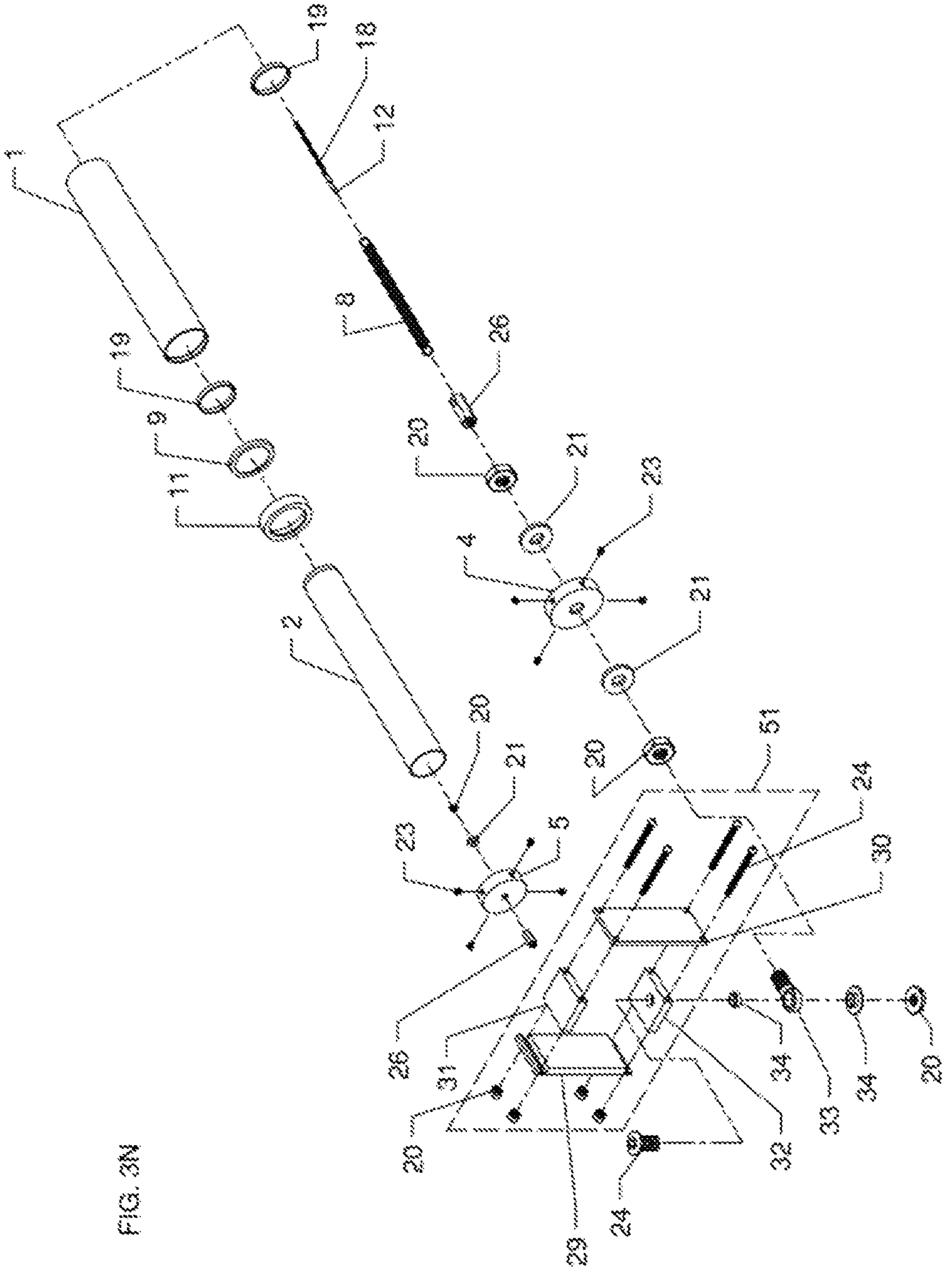
FIG. 3N shows an exploded view of the parts making up one embodiment of a telescoping articulating tensioner with telescoping tube, tension spring, metal rod, and ball joint clamp mount in accordance with one embodiment.
Figure 3P:
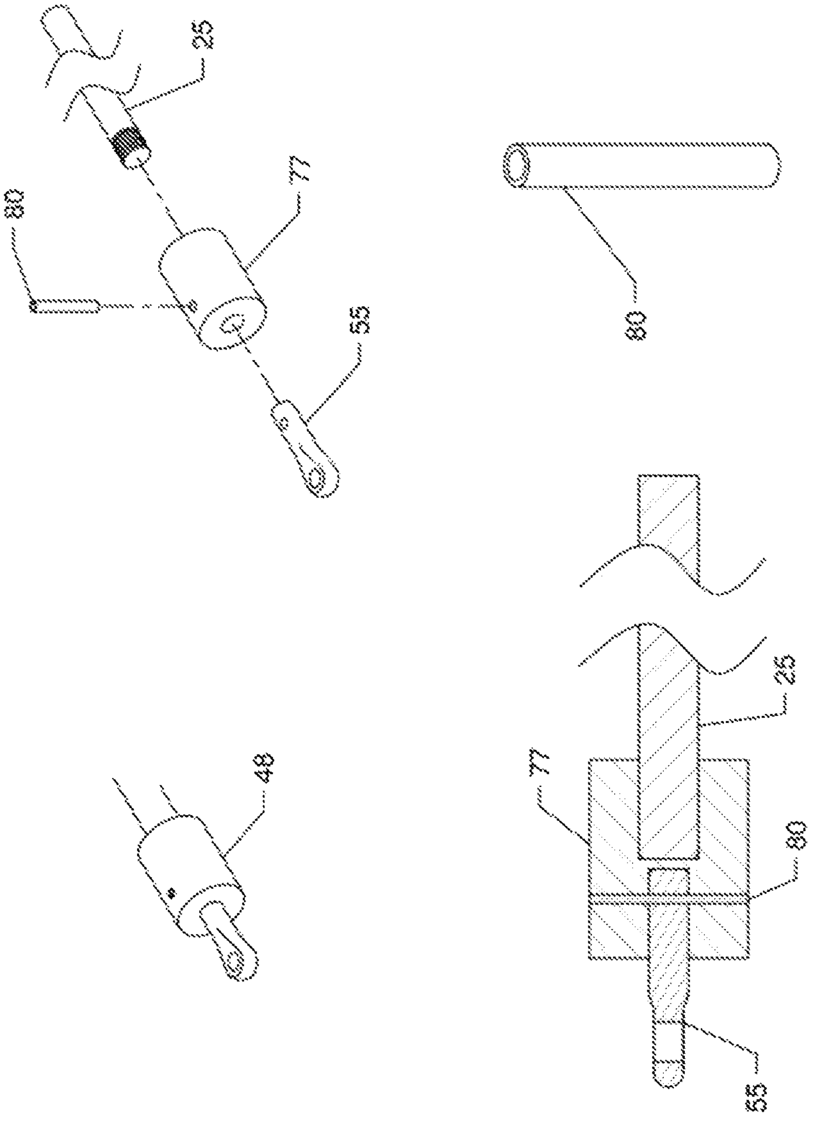
FIG. 3P shows various views and components of one embodiment of a safety release in accordance with one embodiment.

FIG. 3P shows various views and components of an embodiment of a safety release 48. As seen in FIG. 3P another illustrative example of a safety release 48 includes rod 25, cable eye 55, safety release body 77, and shear pin 80. In one embodiment, the operation of the safety release 48 of FIG. 3P is substantially the same as the operation of the safety release 48 of FIG. 3O. However, instead of the ball plunger 76 of FIG. 3O, the embodiment of FIG. 3P includes a shear pin 80 to release the tensioner.

Referring back to FIGS. 3A through 3D, as a result of the connections discussed above, a relatively constant tension is maintained at chain attachment eye 55 at attachment point hook 14 in direction 320 by compression spring 7. Thus, as discussed in more detail below, when chain attachment eye 55 is connected to a safety chain that relatively constant tension is maintained on the safety chain at attachment point hook 14 in direction 320 as the towing vehicle and trailer move down the road and encounter varying road conditions, including but not limited to, uneven roads.

As also discussed in more detail below, in one embodiment, ball joint clamp mount 51 includes a ball joint ball (not shown in FIG. 3D see FIG. 3N, element 33 detail) that allows for movement around a horizontal axis 303 and vertical axis 305 (see FIG. 3B). As a result of this structure, tensioner 321 is relatively free to move to adapt to different forces and force directions. This allows tensioner 321 to maintain a more constant steady force and prevents damage to tensioner 321 even as the towing vehicle and trailer move down the road and encounter varying road conditions, including but not limited to, uneven roads.

FIG. 3E shows the tensioner 301 or 321 of FIG. 3A, 3B, 3C or 3D mounted to a trailer frame 39 by ball joint clamp mount 51 in accordance with one embodiment. FIG. 3E also shows towing vehicle receiver 43 with distal trailer safety chain attachment points 46, vehicle hitch 42, and trailer coupler 41.

As shown in FIG. 3E, in one embodiment, trailer safety chains 38 have distal ends attached to distal trailer safety chain attachment points 46 and proximal end attached to chain attachment hook points 47. As discussed above, safety chains 38 are used as a back-up safety mechanism to provide a temporary connection in case the trailer coupler 41 detaches from the vehicle hitch 42. In the event of such a coupler/hitch detachment, the safety chains 38 keep the trailer and towing vehicle attached at least until the driver can pull off the road. Consequently, safety chains 38 are a critical safety feature used on virtually all standard hitch towing systems.

However, as also discussed above, while safety chains 38 are critical safety feature, typically required by law, the safety chains 38 themselves can present several other types of hazards. This is because the safety chains 38 must be made long enough to adapt to different towing vehicles, trailers, and situations, so there is often significant slack in the safety chains 38 once they are connected. This slack means that the safety chains 38 can drag along the ground as the vehicle is moving down the road. This represents a serious problem for several reasons discussed above.

First dragging safety chains 38 represent a significant fire hazard because dragging safety chains 38 create sparks and heat up due to friction. As a result, dragging safety chains 38 are a significant cause of roadside and off-road fires. Second, as the safety chains 38 drag and bounce along the road, pieces of the safety chains 38 can break off. This weakens the chains and causes a hazard in the form of flying debris/chain pieces and also represents a tire hazard for other vehicles behind and/or that come down the road after the towing vehicle. In addition, dragging safety chains 38 create a distraction to other drivers. For these and other reasons, it is highly desirable to eliminate the risk of dragging safety chains 38.

To this end, referring to FIGS. 3A, 3B, 3C, 3D, and 3E, tensioners 301 or 321 are first coupled to trailer frame 39 by, in this example, ball joint clamp mount 51. As discussed above, in one embodiment, ball joint clamp mount 51 includes a ball joint ball (not shown in FIG. 3B see FIG. 3N, element 33 detail) that allows for movement around a horizontal axis 303 and vertical axis 305 (see FIG. 3B). As a result of this structure, tensioners 301 or 321 are relatively free to move to adapt to different forces and force directions. This allows tensioners 301 or 321 to maintain a more constant steady force and prevents damage to tensioners 301 or 321 even as the towing vehicle and trailer move down the road and encounter varying road conditions, including but not limited to, uneven roads.

In one embodiment, once articulating spring tensioners 301 or 321 are mounted, chain attachment eye 55 is connected to safety chains 38 at the area of slack, i.e., at slack elimination point 290.

As a result of the connections discussed above, a relatively constant tension is maintained at chain attachment eye 55 by tension spring 8 or compression spring 7 in the directions 320 and 370, respectively at slack elimination point 290 even as the towing vehicle and trailer move down the road and encounter varying road conditions, including but not limited to, uneven roads. Thus, as discussed in more detail below, when chain attachment eye 55 is connected to a safety chain 38 that relatively constant tension is maintained on safety chain 38 at slack elimination point 290 and thereby prevents slack from forming in safety chains 38; keeping safety chains 38 taught and above the ground surface even as the towing vehicle and trailer move down the road and encounter varying road conditions, including but not limited to, uneven roads.

In some cases, it is desirable to provide a longer tension path between the slack elimination connection point and the mounting point of the tensioner. In this way a more flexible tensioner system can be provided. One way to provide this feature is to include a tensioner tube with two or more telescoping sections that fit inside each other and can slide past each other.

FIG. 3F shows a telescoping articulating tensioner 351 with telescoping tubes 1 and 2 and swivel clamp mount 27 in accordance with one embodiment.

As seen in FIG. 3F, in one embodiment, telescoping articulating tensioner 351 includes chain attachment point hook 14, cable attachment bolt 16, coupling nut 26, inner tube 2 with inner tube cap 5, dust seal collar 11, outer tube 1 with a tension spring therein and outer tube end cap 4. Also seen in FIG. 3F is tube clamp 28 that, in one embodiment, is attached to articulating tensioner clamp mount assembly 27 by swivel bracket 37.

FIG. 3G shows a cutaway view of one embodiment of a telescoping articulating tensioner 351 with telescoping tube (inner tube 2 and outer tube 1), chain attachment point hook 14, cable 17, cable attachment bolt 16, coupling nut 26, threaded rod 18, distal spring attachment point eye 13, tension spring 8, dust seal 9, dust seal collar 11, proximal spring attachment point eye 12, glide 19, outer tube cap 4, and bolt 24.

As seen in FIG. 3G, in one embodiment, chain attachment point hook 14 is connected to a distal end of cable 17 and a proximal end of cable 17 is attached to cable attachment bolt 16. In one embodiment, cable attachment bolt 16 is connected to threaded rod 18 by coupling nut 26 at a distal end of threaded rod 18. In one embodiment, a proximal end of threaded rod 18 includes distal spring attachment point eye 13 that is connected to a distal end of tension spring 8.

As also seen in FIG. 3G, in one embodiment, inner tube 2 is movably inserted into outer tube 1 such that inner tube 2 is free to slide in either direction 352 or 354 along a centerline axis of telescoping articulating tensioner 351. As also seen in FIG. 3G, in one embodiment, tension spring 8 is positioned in both inner tube 2 and outer tube 1 extending from distal spring attachment point eye 13 in inner tube 2 to proximal spring attachment point eye 12 in outer tube 1.

As also seen in FIG. 3G, in one embodiment, a proximal end of tension spring 8 is connected to proximal spring attachment point eye 12. In one embodiment, proximal spring attachment point eye 12 extends through glide 19 and is secured in place in outer tube cap 4 by bolt 24.

As a result of the connections discussed above, a relatively constant tension is maintained at chain attachment point hook 14 in direction 354 by tension spring 8 and inner tube 2 is free to telescope back and forth within outer tube 1 in either direction 352 or 354 along the centerline of telescoping articulating tensioner 351. Thus, as discussed in more detail below, when chain attachment point hook 14 is connected to a safety chain that relatively constant tension is maintained on the safety chain in direction 354 even as the towing vehicle and trailer move down the road and encounter varying road conditions, including but not limited to, uneven roads.

As also discussed in more detail below, in one embodiment, articulating tensioner clamp mount assembly 27 is identical to the articulating tensioner clamp mount assembly 27 discussed above. Therefore, as discussed above, articulating tensioner clamp mount assembly 27 and swivel bracket 37 include bearings (not shown in FIG. 3G, see FIG. 8B, elements 15) that allow for rotation around horizontal axis 203 and vertical axis 205 (see FIG. 2B). As a result of this structure, telescoping articulating tensioner 351 is free to move at these pivot points to adapt to different forces and force directions. This allows telescoping articulating tensioner 351 to maintain a more constant steady force and prevents damage to telescoping articulating tensioner 351 even as the towing vehicle and trailer move down the road and encounter varying road conditions, including but not limited to, uneven roads.

FIG. 3H shows an exploded view of the parts of one embodiment of a telescoping articulating tensioner 351 and articulating tensioner clamp mount assembly 27 and swivel bracket 37 in accordance with one embodiment.

Shown in FIG. 3H are the following telescoping articulating tensioner 351 parts, and their relative connections and configurations, in accordance with one embodiment: outer tube cap 4, screws 23, bolt 24, proximal spring attachment point eye 12, tension spring 8, distal spring attachment point eye 13, threaded rod 18, glide 19, outer tube 1, tube clamps 28, glide 19, dust seal 9, dust seal collar 11, inner tube 2, nut 20, washer 21, inner tube cap 5, screws 23, coupling nut 26, cable attachment bolt 16, cable 17, and chain attachment point hook 14.

Also Shown in FIG. 3H are the following articulating tensioner clamp mount assembly 27 and swivel bracket 37 parts, and their relative connections and configurations, in accordance with one embodiment: tube clamps 28, nut 20, tube clamp plate 36, bolts 24, washer 21, swivel bracket 37, nut 20, washer 22, bearing 15, bolt 24, nuts 20, clamp rear plate 29, clamp top plate 31, clamp bottom plate 32, bearing 15, bolt 24, clamp front plate 30, and bolts 24.

In the discussion of FIG. 3H above, it is noted that parts having the same generally functionality, such as “bolt,” “glide,” “nut,” “washer,” etc., are given the same designation number such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIG. 3H and listed above, can be made of any materials discussed herein, known in the art at the time of filing, or as made known after the time of filing, suitable for the desired functions.

FIG. 3I shows the telescoping articulating tensioner 351 discussed above coupled to trailer frame 39 by, in this example, an articulating tensioner clamp mount assembly 27. FIG. 3I also shows towing vehicle receiver 43 with distal trailer safety chain attachment points 46, vehicle hitch 42, and trailer coupler 41.

As shown in FIG. 3I, in one embodiment, trailer safety chains 38 have distal ends attached to distal trailer safety chain attachment points 46 and proximal ends attached to safety chain proximal end attachment points 47. As discussed above, safety chains 38 are used as a back-up safety mechanism to provide a temporary connection in case the trailer coupler 41 detaches from the vehicle hitch 42. In the event of such a coupler/hitch detachment, the safety chains 38 keep the trailer and towing vehicle attached at least until the driver can pull off the road. Consequently, safety chains 38 are a critical safety feature used on virtually all standard hitch towing systems.

However, as also discussed above, while safety chains 38 are critical safety feature, typically required by law, the safety chains 38 themselves can present several other types of hazards. This is because the safety chains 38 must be made long enough to adapt to different towing vehicles, trailers, and situations, so there is often significant slack in the safety chains 38 once they are connected. This slack means that the safety chains 38 can drag along the ground as the vehicle is moving down the road. This represents a serious problem for several reasons discussed above. Thus, it is highly desirable to eliminate the risk of dragging safety chains 38.

To this end, referring to FIGS. 3F, 3G, 3H, and 3I, in one embodiment, tensioner 351 is first coupled to trailer frame 39 by, in this example, articulating tensioner clamp mount assembly 27.

As discussed above, in one embodiment, articulating tensioner clamp mount assembly 27 and swivel bracket 37 include bearings (not shown in FIG. 3I, see FIG. 3H, element 15) that allow for rotation around horizontal axis 203 and vertical axis 205 (FIG. 2B). As a result of this structure, telescoping articulating tensioner 351 is free to move at these pivot points to adapt to different forces and force directions. This allows telescoping articulating tensioner 351 to maintain a more constant steady force and prevents damage to telescoping articulating tensioner 351 even as the towing vehicle and trailer move down the road and encounter varying road conditions including, but not limited to, uneven roads.

Once telescoping articulating tensioner 351 is mounted, in one embodiment, chain attachment point hook 14 is connected to safety chains 38 at the area of slack, i.e., at slack elimination point 390.

As discussed above, in one embodiment, when telescoping articulating tensioner 351 is used, chain attachment point hook 14 is connected to a first, or distal, end of wire rope cable 56. In one embodiment, a second, or proximal end of wire rope cable 56 is connected to a glide 19, such as a nylon glide, with a distal spring attachment point eye 13. In one embodiment, a first, or distal, end of tension spring 8 is attached to spring attachment point eye 13 and a second, or proximal end, of tension spring 8 is attached to proximal spring attachment point eye 12. In one embodiment, proximal spring attachment point eye 12 is held in place against tube cap 6 with bolt 24.

As a result of the connections discussed above, when telescoping articulating tensioner 351 chain attachment point hook 14 is attached at slack elimination point 390 a relatively constant tension in direction 320 is maintained at chain attachment point hook 14 even as the towing vehicle and trailer move down the road and encounter varying road conditions, including but not limited to, uneven roads. Thus, as discussed in more detail below, when chain attachment point hook 14 is connected to a safety chain 38 that relatively constant tension is maintained on safety chain 38 at slack elimination point 390 in direction 320 and thereby prevents slack from forming in safety chains 38; keeping safety chains 38 taught and above the ground surface even as the towing vehicle and trailer move down the road and encounter varying road conditions, including but not limited to, uneven roads.

FIG. 3J shows a side view of a telescoping articulating tensioner 351 with telescoping tubes 1 and 2 and ball joint rod clamp mount assembly 51 in accordance with one embodiment.

As seen in FIG. 3J, in one embodiment, telescoping articulating tensioner 351 includes chain attachment point hook 14, cable 17, dust seal collar 11, cable attachment bolt 16, inner tube 2 with inner tube cap 5, outer tube 1 with tension spring 8 therein and outer tube cap 4.

Also seen in FIG. 3J is ball joint rod 33 extending through outer tube cap 4 and attached to ball joint rod clamp mount assembly 51 by bolt 24 and spacer 34 in accordance with one embodiment. In one embodiment, ball joint rod clamp mount assembly 51 is identical to the ball joint rod clamp mount assembly 51 discussed above with respect to FIG. 3D. As discussed above, in one embodiment, ball joint clamp mount 51 includes a ball joint ball (not shown in FIG. 3J see FIG. 3N, element 33 detail) that allows for movement around a horizontal axis 303 and vertical axis 305 (see FIG. 3B). As a result of this structure, tensioner 351 is relatively free to move to adapt to different forces and force directions. This allows tensioner 351 to maintain a more constant steady force and prevents damage to tensioner 351.

FIG. 3K shows a front view of telescoping articulating tensioner 351 and ball joint clamp mount 51 in accordance with one embodiment.

FIG. 3L shows a back view of telescoping articulating tensioner 351 and ball joint clamp mount 51 in accordance with one embodiment.

FIG. 3M shows one embodiment of a cutaway view of one embodiment of a telescoping articulating tensioner 351 with telescoping tube (inner tube 2 and outer tube 1), chain attachment point hook 14, cable 17, cable attachment bolt 16, coupling nut 26, threaded rod 18, distal spring attachment point eye 13, tension spring 8, dust seal 9, dust seal collar 11, proximal spring attachment point eye 12, glide 19, outer tube cap 4, inner tube cap 5, and bolt 24.

As seen in FIG. 3M, in one embodiment, chain attachment point hook 14 is connected to a distal end of cable 17 and a proximal end of cable 17 is attached to cable attachment bolt 16. In one embodiment, cable attachment bolt 16 is connected to threaded rod 18 by coupling nut 26 at a distal end of threaded rod 18. In one embodiment, a proximal end of threaded rod 18 includes distal spring attachment point eye 13 that is connected to a distal end of tension spring 8.

As also seen in FIG. 3M, in one embodiment, inner tube 2 is movably inserted into outer tube 1 such that inner tube 2 is free to slide in either direction 352 or 354 along a centerline axis of telescoping articulating tensioner 351. As also seen in FIG. 3G, in one embodiment, tension spring 8 is positioned in both inner tube 2 and outer tube 1 extending from distal spring attachment point eye 13 in inner tube 2 to proximal spring attachment point eye 12 in outer tube 1.

As also seen in FIG. 3M, in one embodiment, a proximal end of tension spring 8 is connected to proximal spring attachment point eye 12. In one embodiment, proximal spring attachment point eye 12 extends through glide 19 and is secured in place in outer tube cap 4 by bolt 24.

Also seen in FIG. 3M is ball joint rod 33 extending through outer tube cap 4 and attached to ball joint rod clamp mount assembly 51 by bolt 24, nuts 20, and spacer 34. In one embodiment, ball joint rod clamp mount assembly 51 is identical to the ball joint rod clamp mount assembly 51 discussed above with respect to FIG. 3D. As discussed above, in one embodiment, ball joint clamp mount 51 includes a ball joint ball (not shown in FIG. 3M see FIG. 3N, element 33 detail) that allows for movement around a horizontal axis 303 and vertical axis 305 (see FIG. 3B). As a result of this structure, tensioner 351 is relatively free to move to adapt to different forces and force directions. This allows tensioner 351 to maintain a more constant steady force and prevents damage to tensioner 351.

As a result of the connections discussed above, a relatively constant tension is maintained at chain attachment point hook 14 in direction 354 by tension spring 8 and inner tube 2 is free to telescope back and forth within outer tube 1 in either direction 352 or 354 along the centerline of telescoping articulating tensioner 351. Thus, as discussed in more detail below, when chain attachment point hook 14 is connected to a safety chain that relatively constant tension is maintained on the safety chain even as the towing vehicle and trailer move down the road and encounter varying road conditions, including but not limited to, uneven roads.

FIG. 3N shows an exploded view of the parts making up one embodiment of a telescoping articulating tensioner 351 and ball joint clamp mount 51 in accordance with one embodiment.

Shown in FIG. 3N are the following telescoping articulating tensioner 351 parts, and their relative connections and configurations, in accordance with one embodiment: coupling nut 26, inner tube cap 5, screws 23, washer 21, nut 20, inner tube 2, dust seal collar 11, dust seal 9, glide 19, outer tube 1, glide 19, threaded rod 18, proximal spring attachment point eye 12, tension spring 8, coupling nut 26, nut 20, washer 21, outer tube cap 4, screws 23, washer 21, nut 20, and ball joint rod 33.

Also Shown in FIG. 3N are the following ball joint clamp mount 51 parts, and their relative connections and configurations, in accordance with one embodiment: clamp rear plate 29, nuts 20, clamp top plate 31, clamp front plate 30, bolts 24, clamp bottom plate 32, bolt 24, spacer 34, ball joint rod 33, spacer 34, and nut 20.

In the discussion of FIG. 3N above, it is noted that parts having the same generally functions, such as "bolt," "glide," "nut," "washer," etc., are given the same designation number such as "bolt 24," "glide 19," "nut 20," "washer 22," etc. However, this nomenclature system does not indicate these functional parts are the same or identical in either size, placement, or materials used. These are instead only functional/use designations. In addition, the parts shown in FIG. 3N and listed above, can be made of any materials discussed herein, known in the art at the time of filing, or as made known after the time of filing, which can result in the desired functions.

Figure 4:
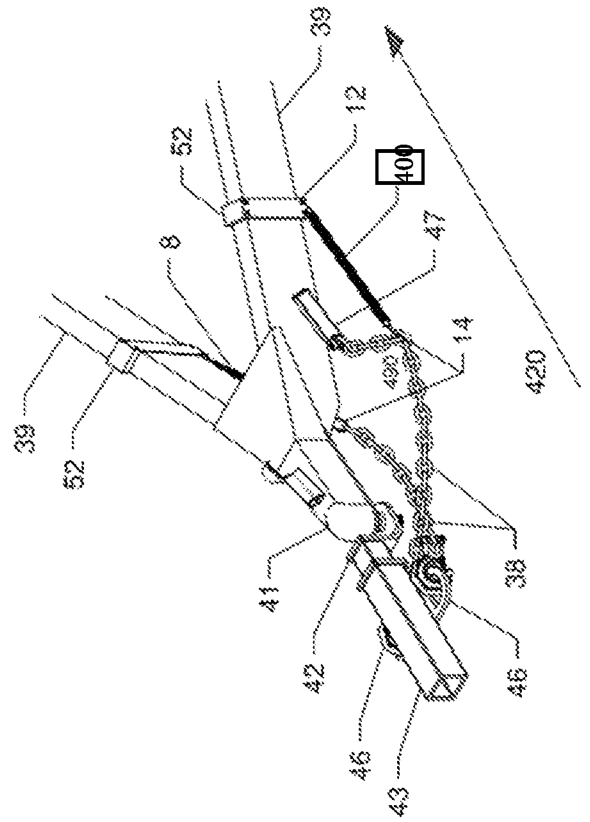
FIG. 4 shows a tensioner with a simple spring tension element mounted to a trailer with safety chains using a simple clamp mount and a trailer hitch in accordance with one embodiment.

FIG. 4 shows a bare tension spring tensioner 400 mounted to trailer frame 39 by, in this example, simple clamp 52 in accordance with one embodiment.

As seen in FIG. 4 in one embodiment, a proximal end of bare tension spring tensioner 8 is first coupled to trailer frame 39 by, in this example simple clamp 52 via attachment point 12. Once bare tension spring tensioner 400 is mounted, in one embodiment, a distal end of bare tension spring tensioner 400 is attached to safety chain 38 at the area of slack, i.e., at slack elimination point 490, using chain attachment point hook 14.

When telescoping articulating bare tension spring tensioner 400 is used, the connections discussed above result in a relatively constant tension being maintained at chain attachment point hook 14 in direction 420 even as the towing vehicle and trailer move down the road and encounter varying road conditions, including but not limited to, uneven roads. Thus, as discussed in more detail below, when chain attachment point hook 14 is connected to a safety chain 38 that relatively constant tension is maintained on safety chain 38 at slack elimination point 490 and thereby prevents slack from forming in safety chains 38; keeping safety chains 38 taught and above the ground surface even as the towing vehicle and trailer move down the road and encounter varying road conditions, including but not limited to, uneven roads.

Figure 5A:
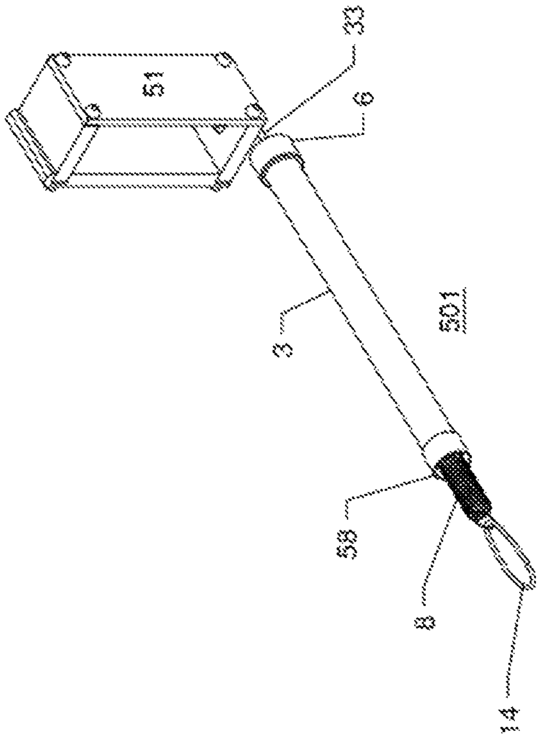
FIG. 5A shows a perspective view of an open-ended spring tensioner and ball joint clamp mount in accordance with one embodiment.

FIG. 5A shows a perspective view of an open-ended spring open end tensioner 501 and ball joint clamp mount 51 in accordance with one embodiment.

As seen in FIG. 5A, in one embodiment, open end tensioner 501 includes open end tube 3 with tube cap 6 mounted to ball joint rod 33 which is attached to ball joint clamp mount 51. As also seen in FIG. 5A, in one embodiment, open end tensioner 501 and chain attachment point hook 14 connected to a distal end of tension spring 8 at reinforcing collar 58. In one embodiment, chain attachment point hook 14 and the distal end of tension spring 8 are free to move and out of reinforcing collar 58 of open-end tube 3.

In one embodiment, ball joint rod clamp mount assembly 51 is identical to the ball joint rod clamp mount assembly 51 discussed above with respect to FIG. 3D. As discussed above, in one embodiment, ball joint clamp mount 51 includes a ball joint ball (not shown in FIG. 5A see FIG. 3N, element 33 detail) that allows for movement around a horizontal axis 303 and vertical axis 305 (see FIG. 3B). As a result of this structure, open end tensioner 501 is relatively free to move to adapt to different forces and force directions. This allows open end tensioner 501 to maintain a more constant steady force and prevents damage to open end tensioner 501.

Figures 5B, 5C, 5D:
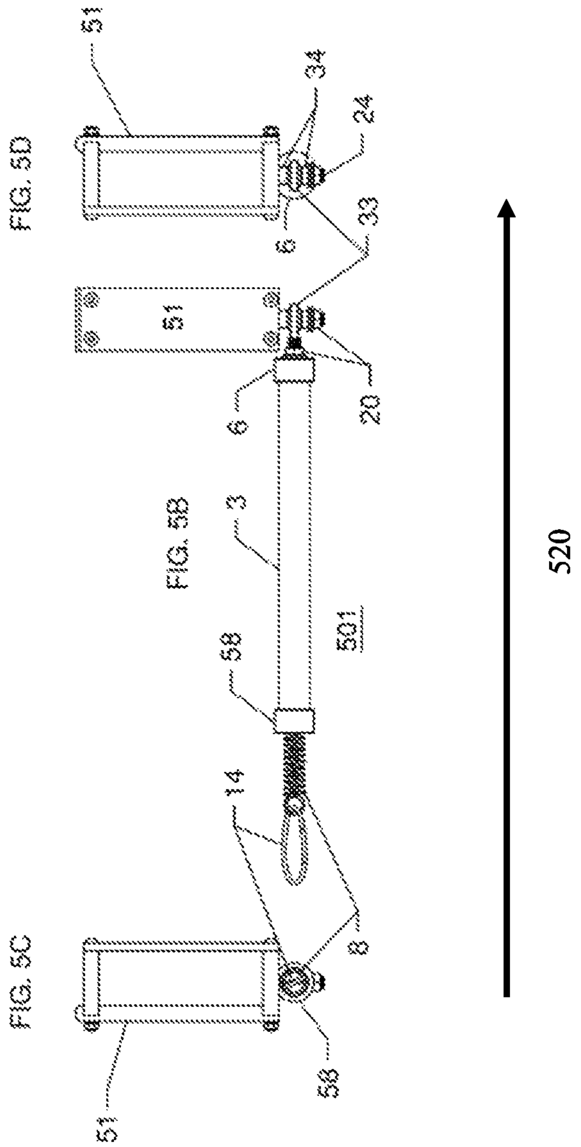
FIG. 5B shows a side view of an open-ended spring tensioner and ball joint clamp mount in accordance with one embodiment.
FIG. 5C shows a head-on view of an open-ended spring tensioner and ball joint clamp mount in accordance with one embodiment.
FIG. 5D shows a rear view of an open-ended spring tensioner and ball joint clamp mount in accordance with one embodiment.

FIG. 5B shows a side perspective view of open-ended spring open end tensioner 501 and ball joint clamp mount 51 in accordance with one embodiment.

As seen in FIG. 5B, in one embodiment, open end tensioner 501 includes open end tube 3 with tube cap 6 mounted to ball joint rod 33 and nuts 20, washers/spacers 34, and bolt 24 which attaches ball joint rod 33 to ball joint clamp mount 51. As also seen in FIG. 5B, in one embodiment, open end tensioner 501 chain attachment point hook 14 connected to a distal end of tension spring 8 at reinforcing collar 58. In one embodiment, chain attachment point hook 14 and the distal end of tension spring 8 are free to move in and/or out of reinforcing collar 58 of open-end tube 3. Thus, a relatively constant force is exerted on chain attachment point hook 14 in direction 520.

FIG. 5C shows a head-on view of an open-end tensioner 501 and ball joint clamp mount 51 in accordance with one embodiment.

FIG. 5D shows a rear view of open-end tensioner 501 and ball joint clamp mount 51 in accordance with one embodiment.

Figure 5E:
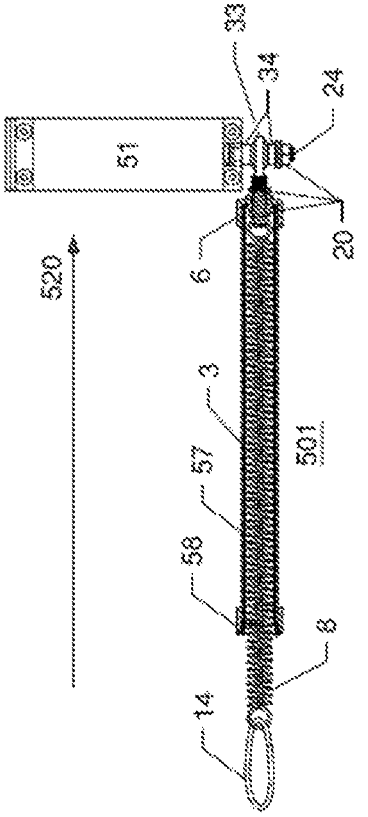
FIG. 5E shows a cutaway side view of an open-ended spring tensioner and ball joint clamp mount in accordance with one embodiment.

FIG. 5E shows a cutaway view of the open-end tensioner 501 that includes more details of the inner workings of one embodiment of open-end tensioner 501, including a tension spring 8.

As seen in FIG. 5E, in one embodiment, open end tensioner 501 includes open end tube 3 with tube cap 6 mounted to ball joint rod 33 which is attached to ball joint clamp mount 51. As seen in FIG. 5E, a plastic liner 57 is positioned inside open end tube 3 between an inner surface of open tube 3 and tension spring 8 to provide ease of movement, i.e., extension and contraction of tension spring 8 within open tube 3.

As also seen in FIG. 5E, in one embodiment, chain attachment point hook 14 is connected to a distal end of tension spring 8 and a proximal end of tension soring 8 is connected to ball joint rod 33 by nuts 20. Thus, tension spring 8 is held in position within plastic liner 57 of open tube 3 but is free to expand and contract along a centerline of open tube 3 so that a greater or lesser portion of tension spring 8, respectively extends beyond the open end of open tube 3 and reinforcing collar 58.

As a result of the connections discussed above, a relatively constant tension is maintained at chain attachment point hook 14 by tension spring 8 in the direction 520 from distal the end to proximal end or open-end tensioner 501. Thus, as discussed in more detail below, when chain attachment point hook 14 is connected to a safety chain that relatively constant tension is maintained on the safety chain even as the towing vehicle and trailer move down the road and encounter varying road conditions, including but not limited to, uneven roads.

In one embodiment, ball joint rod clamp mount assembly 51 is identical to the ball joint rod clamp mount assembly 51 discussed above with respect to FIG. 3D. As discussed above, in one embodiment, ball joint clamp mount 51 includes a ball joint ball (not shown in FIG. 5E see FIG. 3N, element 33 detail) that allows for movement around a horizontal axis 303 and vertical axis 305 (see FIG. 3B). As a result of this structure, open end tensioner 501 is relatively free to move to adapt to different forces and force directions so open-end tensioner 501 is relatively free to move to adapt to different forces and force directions. This allows open end tensioner 501 to maintain a more constant steady force and prevents damage to open end tensioner 501 even as the towing vehicle and trailer move down the road and encounter varying road conditions, including but not limited to, uneven roads.

Figure 5F:
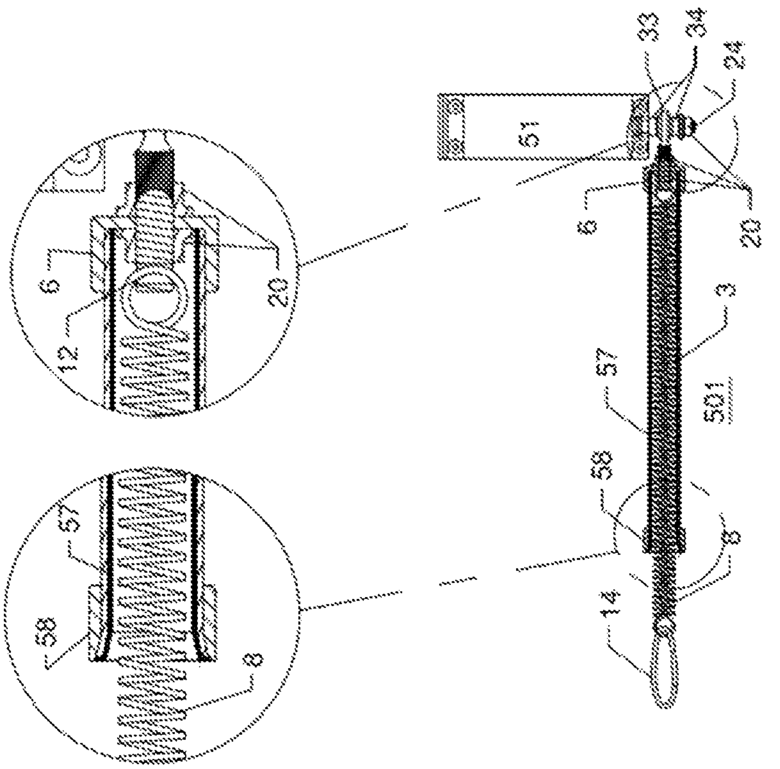
FIG. 5F shows a cutaway side view of an open-ended spring tensioner and ball joint clamp mount including connector details in accordance with one embodiment.

FIG. 5F shows a cut away side view of spring open end tensioner 501 and ball joint clamp mount 51 in accordance with one embodiment that includes details of the structure and connections of open-end tube 3, plastic liner 57 positioned inside open end tube 3 between an inner surface of open tube 8 and tension spring 8 and reinforcing collar 58.

FIG. 5F also shows details of the structure and connections of end cap 6, nuts 20, and ball joint rod 33 of open-end tensioner 501 in accordance with one embodiment.

Figure 5G:
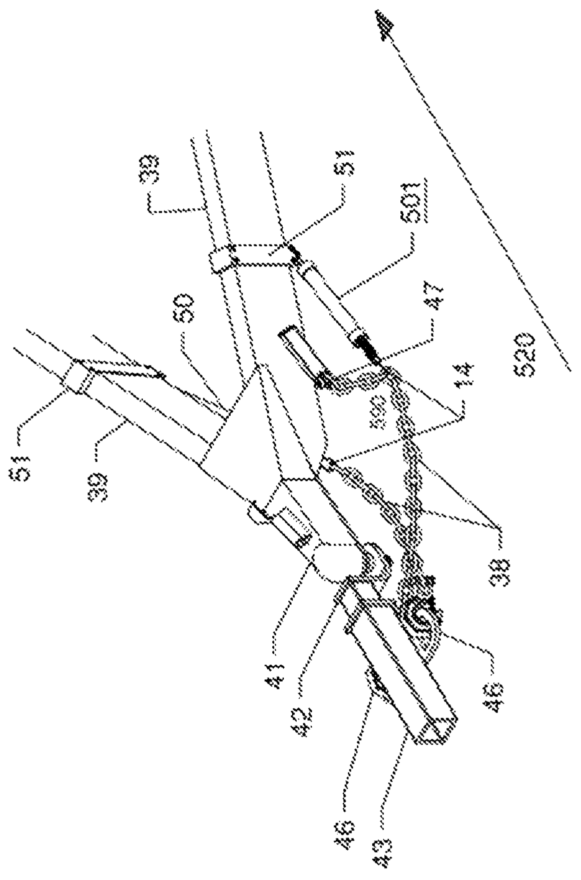
FIG. 5G shows an open-ended spring tensioner coupled to trailer frame by, in this example, ball joint clamp mount, in accordance with one embodiment.

FIG. 5G shows one embodiment of an open-ended spring tensioner 501 mounted to a trailer frame 39 with a ball joint clamp mount 51, safety chains 38 and a trailer hitch 42 in accordance with one embodiment. FIG. 5G also shows towing vehicle receiver 43 with distal trailer safety chain attachment points 46, and trailer coupler 41.

As shown in FIG. 5G, in one embodiment, trailer safety chains 38 have distal ends attached to distal trailer safety chain attachment points 46 and proximal end attached to chain attachment hook points 47. As discussed above, safety chains 38 are used as a back-up safety mechanism to provide a temporary connection in case the trailer coupler 41 detaches from the vehicle hitch 42. In the event of such a coupler/hitch detachment, the safety chains 38 keep the trailer and towing vehicle attached at least until the driver can pull off the road. Consequently, safety chains 38 are a critical safety feature used on virtually all standard hitch towing systems.

However, as also discussed above, while safety chains 38 are critical safety feature, typically required by law, the safety chains 38 themselves can present several other types of hazards. This is because the safety chains 38 must be made long enough to adapt to different towing vehicles, trailers, and situations, so there is often significant slack in the safety chains 38 once they are connected. This slack means that the safety chains 38 can drag along the ground as the vehicle is moving down the road. This represents a serious problem for several reasons discussed above.

First dragging safety chains 38 represent a significant fire hazard because dragging safety chains 38 create sparks and heat up due to friction. As a result, dragging safety chains 38 are a significant cause of roadside and off-road fires. Second, as the safety chains 38 drag and bounce along the road, pieces of the safety chains 38 can break off. This causes a hazard in the form of flying debris/chain pieces and also represents a tire hazard for other vehicles behind and/or that come down the road after the towing vehicle. In addition, dragging safety chains 38 create a distraction to other drivers. For these and other reasons, it is highly desirable to eliminate the risk of dragging safety chains 38.

To this end, referring to FIGS. 5A, 5B, 5C, 5D, 5E, 5F and 5G, open ended spring tensioners 501 are first coupled to trailer frame 39 by, in this example, ball joint clamp mount 51. As discussed above, in one embodiment, ball joint clamp mount 51 includes a ball joint ball (not shown in FIG. 3B see FIG. 3N, element 33 detail) that allows for movement around a horizontal axis 303 and vertical axis 305 (see FIG. 3B). As a result of this structure, open ended spring tensioners 501 are relatively free to move to adapt to different forces and force directions. This allows open ended spring tensioners 501 to maintain a more constant steady force and prevents damage to open ended spring tensioner 501 even as the towing vehicle and trailer move down the road and encounter varying road conditions, including but not limited to, uneven roads.

In one embodiment, once open-ended spring tensioners 501 are mounted, chain attachment point hook 14 is connected to safety chains 38 at the area of slack, i.e., at slack elimination point 590.

As a result of the connections discussed above, a relatively constant tension is maintained at chain attachment point hook 14 by tension spring 8 in the direction 520 at slack elimination point 590 even as the towing vehicle and trailer move down the road and encounter varying road conditions, including but not limited to, uneven roads. Thus, as discussed in more detail below, when chain attachment point hook 14 is connected to a safety chain 38 that relatively constant tension is maintained on safety chain 38 at slack elimination point 590 in direction 520 and thereby prevents slack from forming in safety chains 38; keeping safety chains 38 taught and above the ground surface even as the towing vehicle and trailer move down the road and encounter varying road conditions, including but not limited to, uneven roads.

In addition, as a result of the connections discussed above, a relatively constant tension is maintained at chain attachment point hook 14 by tension spring 8 in the direction 520 at slack elimination point 590 even as the towing vehicle and trailer turn. In the prior art, absent the disclosed embodiments, when two sets of safety chains 38 are used, one on each side of the towing trailer tongue, when a turn was made, one set of safety chains 38 would have extra tension, and little of no slack, while the other set would have even more slack, and more chance of dragging. However, as noted, using the disclosed embodiments, a relatively constant tension is maintained at chain attachment point hook 14 by tension spring 8 in the direction 520 at slack elimination point 590, thus, when chain attachment point hook 14 is connected to a safety chain 38 that relatively constant tension is maintained on safety chain 38 at slack elimination point 590 in direction 520 and thereby prevents slack from forming in safety chains 38; keeping safety chains 38 taught and above the ground surface even as the towing vehicle and trailer are turning.

Figure 6A:
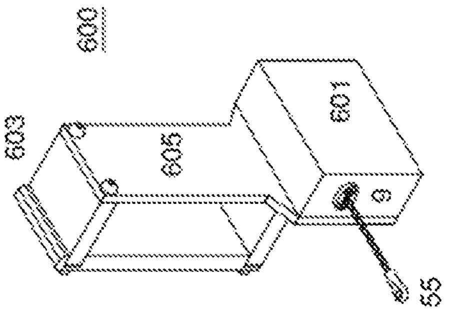
FIG. 6A shows a rotary spring tensioner in accordance with one embodiment.

FIG. 6A shows a rotary spring tensioner 600 in accordance with one embodiment. As seen in FIG. 6A, in one embodiment, rotary spring tensioner 600 includes rotary spring housing 601, chain attachment eye 55, dust seal 9, and rotary spring tensioner clamp 603 with spool attachment plate 605.

Figure 6B:
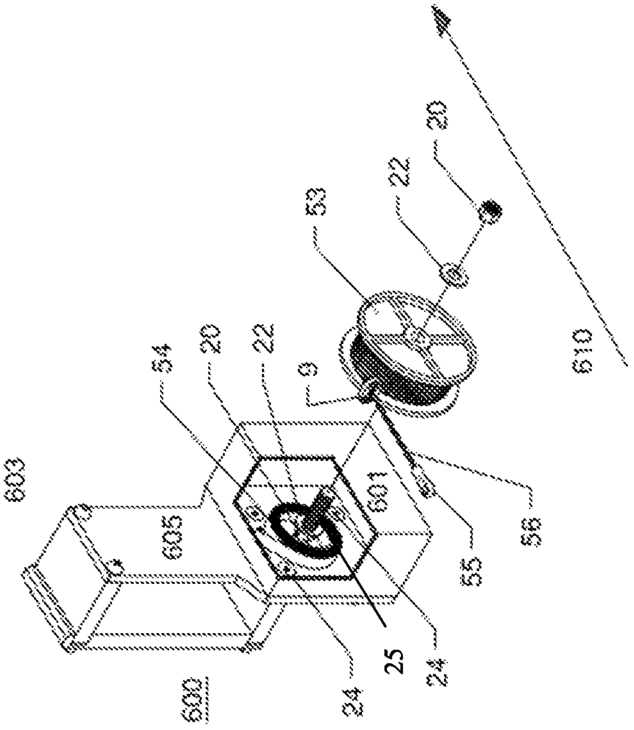
FIG. 6B shows a cutaway view of a rotary spring tensioner in accordance with one embodiment.

FIG. 6B shows a cutaway view of a rotary spring tensioner 600 in accordance with one embodiment. As seen in FIG. 6B, in one embodiment, rotary spring tensioner 600 includes rotary spring tensioner clamp 603 with rotary spring housing 601 attached by spool attachment plate 605 and bolts 24.

In one embodiment, rotary spring housing 601 holds rotary spring 54 wrapped around rod 25 held in place by nut 20. In one embodiment, washer 22 is placed on rod 25 as is spool 53. Spool 53 is then attached to rod 25 by washer 22 and nut 20. Wire rope or cable 56 is wrapped around spool 53. Wire rope 56 is attached to chain attachment eye 55 spool 53 is then attached to rod 25 by washer 22 and nut 20.

In one embodiment, rotary spring 54 exerts a clockwise force on spool 53 and therefore a tension on wire rope 56 and chain attachment eye 55 in direction 610. Consequently, as a result of the connections discussed above, a relatively constant tension is maintained at wire rope 56 and chain attachment eye 55. Thus, when chain attachment point hook 14 is connected to a safety chain that relatively constant tension is maintained on safety chain at the point of attachment to safety chain, e.g., at the slack elimination point so that slack is prevented from forming in the safety chains; keeping the safety chains taught and above the ground surface even as the towing vehicle and trailer move down the road and encounter varying road conditions, including but not limited to, uneven roads.

In the discussion of FIGS. 6A and 6B above, it is noted that parts having the same generally functionality, such as “bolt,” “glide,” “nut,” “washer,” etc., are given the same designation number such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIGS. 6A and 6B and listed above, can be made of any materials discussed herein, known in the art at the time of filing, or as made known after the time of filing, which can result in the desired functions.

Various types of clamps can be used in various embodiments to attached the disclosed safety chain tensioners to trailers and/or trailer frames.

Figure 7B:
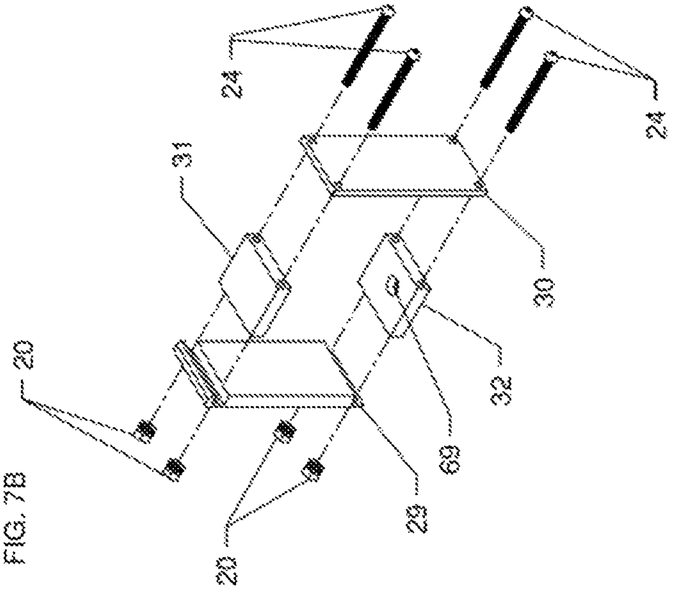
FIG. 7B shows the parts of the swivel clamp of FIG. 7A in accordance with one embodiment.
Figure 7A:
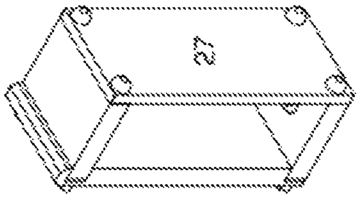
FIG. 7A shows a swivel clamp in accordance with one embodiment.

FIG. 7A shows swivel clamp 27 in accordance with one embodiment. FIG. 7B shows the parts of the swivel clamp 27 of FIG. 7A in accordance with one embodiment.

As seen in FIGS. 7A and 7B, in one embodiment, swivel clamp 27 includes nuts 20, clamp rear plate 29, clamp top plate 31, clamp bottom plate 32, clamp front plate 30, bolts 24 and hole 69 in clamp bottom plate 32 for holding a bearing 15, not shown in FIG. 7B, see FIG. 3N.

In the discussion of FIGS. 7A and 7B above, it is noted that parts having the same generally functionality, such as “bolt,” “glide,” “nut,” “washer,” etc., are given the same designation number, such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIGS. 7A and 7B and listed above, can be made of any materials discussed herein, known in the art at the time of filing, or as made known after the time of filing, which can result in the desired functions.

Figure 8A:
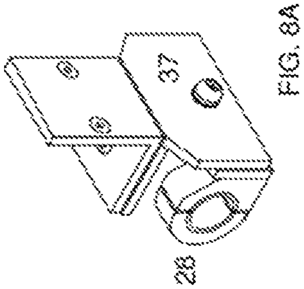
FIG. 8A shows a tube mount in accordance with one embodiment.
Figure 8B:
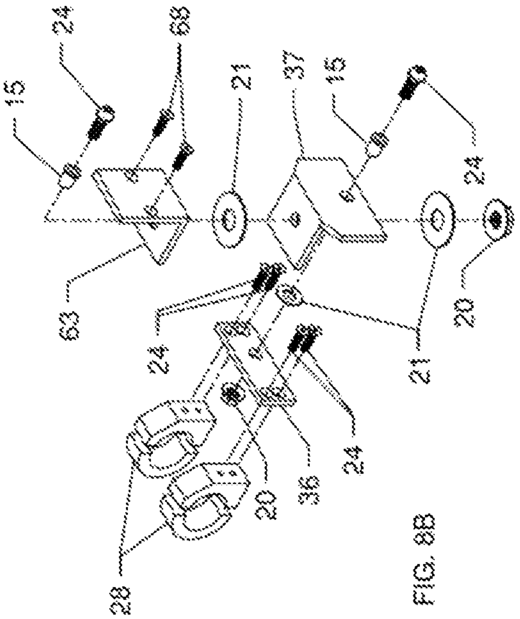
FIG. 8B shows the parts of the tube mount of FIG. 8A in accordance with one embodiment.

FIG. 8A shows a tube mount 28 in accordance with one embodiment. FIG. 8B shows the parts of tube mount 28 in accordance with one embodiment.

As seen in FIGS. 8A and 8B, in one embodiment, tube mount 28 includes tube mounts 28, nut 20, tube clamp plate 36, bolts 24, washer 21, swivel bracket 37, bearing 15, bolts 24, washer 21, angle mounting bracket 63, bearing 15, and bolt 24.

In the discussion of FIGS. 8A and 8B above, it is noted that parts having the same generally functionality, such as “bolt,” “glide,” “nut,” “washer,” etc., are given the same designation number, such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIGS. 8A and 8B and listed above, can be made of any materials discussed herein, known in the art at the time of filing, or as made known after the time of filing, which can result in the desired functions.

Figure 9A:
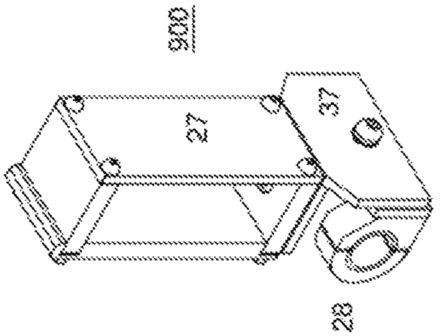
FIG. 9A shows a combined swivel clamp and tube mount in accordance with one embodiment.
Figure 9B:
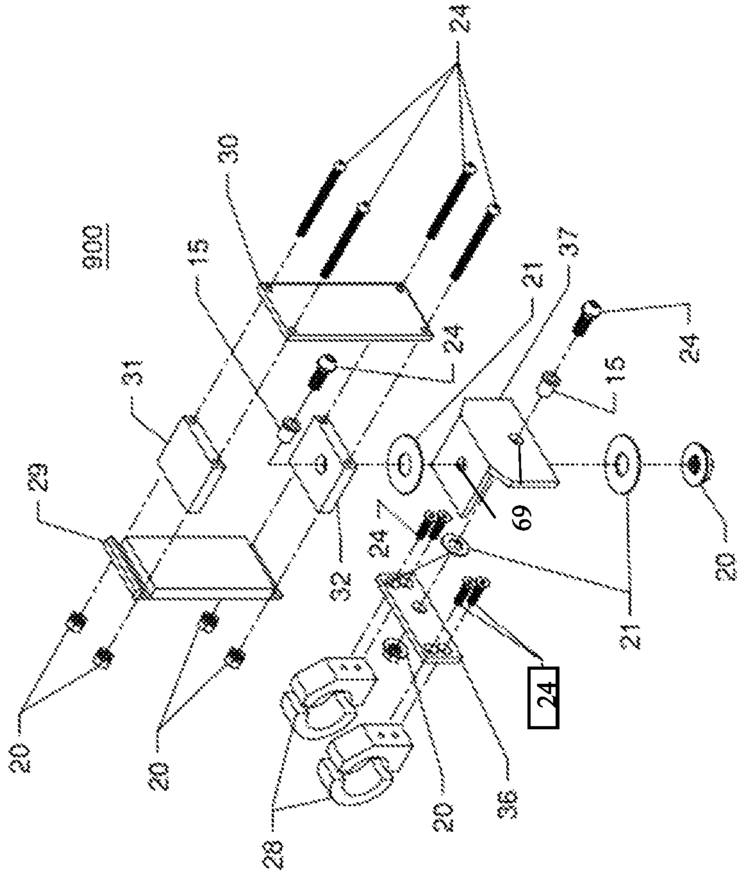
FIG. 9B shows the parts of the combined swivel clamp and tube mount of FIG. 9A in accordance with one embodiment.

FIG. 9A shows a combined swivel clamp and tube mount 900, including swivel clamp 27, tube mounts 28, and swivel bracket 37 in accordance with one embodiment. FIG. 9B shows the parts of the combined swivel clamp and tube mount 900, in accordance with one embodiment.

As seen in FIGS. 9A and 9B, in one embodiment, swivel clamp 27 of combined swivel clamp and tube mount 900 includes nuts 20, clamp rear plate 29, clamp top plate 31, clamp bottom plate 32, clamp front plate 30, and bolts 24, and hole 69 in clamp bottom plate 32 for holding a bearing 15.

As also seen in FIGS. 9A and 9B, in one embodiment, tube mount 28 and swivel bracket 37 of combined swivel clamp and tube mount 900 include tube mounts 28, nut 20, tube clamp plate 36, bolts 24, washer 21, bearing 15, bolts 24, washer 21, bearing 15, and bolt 24.

In the discussion of FIGS. 9A and 9B above, it is noted that parts having the same generally functionality, such as “bolt,” “glide,” “nut,” “washer,” etc., are given the same designation number such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIGS. 9A and 9B and listed above, can be made of any materials discussed herein, known in the art at the time of filing, or as made known after the time of filing, which can result in the desired functions.

FIG. 10A shows a U bracket 1000 in accordance with one embodiment. FIG. 10B shows the parts of the U bracket 1000 of FIG. 10A, in accordance with one embodiment.

Referring to FIGS. 10A and 10B, in one embodiment, U bracket 1000 includes U bolts 59, upper insulating pad 60, lower insulating pad 81, pressure plate 67, lower mounting bracket 61, hole 69, and nuts 20.

In the discussion of FIGS. 10A and 10B above, it is noted that parts having the same generally functionality, such as “bolt,” “glide,” “nut,” “washer,” etc., are given the same designation number, such as “bolt 24,” “glide 19,” “nut 20,” “washer 22,” etc. However, this nomenclature system does not indicate these functional parts are, or must be, the same or identical in either size, placement, or materials used. These are instead only functional/use designations. In addition, the parts shown in FIGS. 10A and 10B and listed above, can be made of any materials discussed herein, known in the art at the time of filing, or as made known after the time of filing, which can result in the desired functions.

FIG. 10C shows a side view of a U bracket and ball joint rod clamp mount assembly 1000 used with an open-ended tensioner, such as open-ended tensioner 501 discussed above, in accordance with one embodiment.

FIG. 10D shows a front view of a U bracket and ball joint rod clamp mount assembly 1000 used with an open-ended tensioner, such as open-ended tensioner 501 discussed above, in accordance with one embodiment.

FIG. 11A shows a U frame adjustable mounting bracket 1100 in accordance with one embodiment. FIG. 11B shows the parts of the U frame adjustable mounting bracket 1100 of FIG. 11A, in accordance with one embodiment.

Referring to FIGS. 11A and 11B, in one embodiment, U bracket 1100 includes U bolts 59, upper insulating pad 60, lower insulating pad 81, pressure plate 67, lower mounting bracket 61, angle mounting bracket 63, swivel bracket 64, hole 69, bolts 24, and nuts 20.

In the discussion of FIGS. 11A and 11B above, it is noted that parts having the same generally functionality, such as "bolt," "glide," "nut," "washer," etc., are given the same designation number such as "bolt 24," "glide 19," "nut 20," "washer 22," etc. However, this nomenclature system does not indicate these functional parts are, or must be, the same or identical in either size, placement, or materials used. These are instead only functional/use designations. In addition, the parts shown in FIGS. 11A and 11B and listed above, can be made of any materials discussed herein, known in the art at the time of filing, or as made known after the time of filing, which can result in the desired functions.

Figures 11C, 11D:
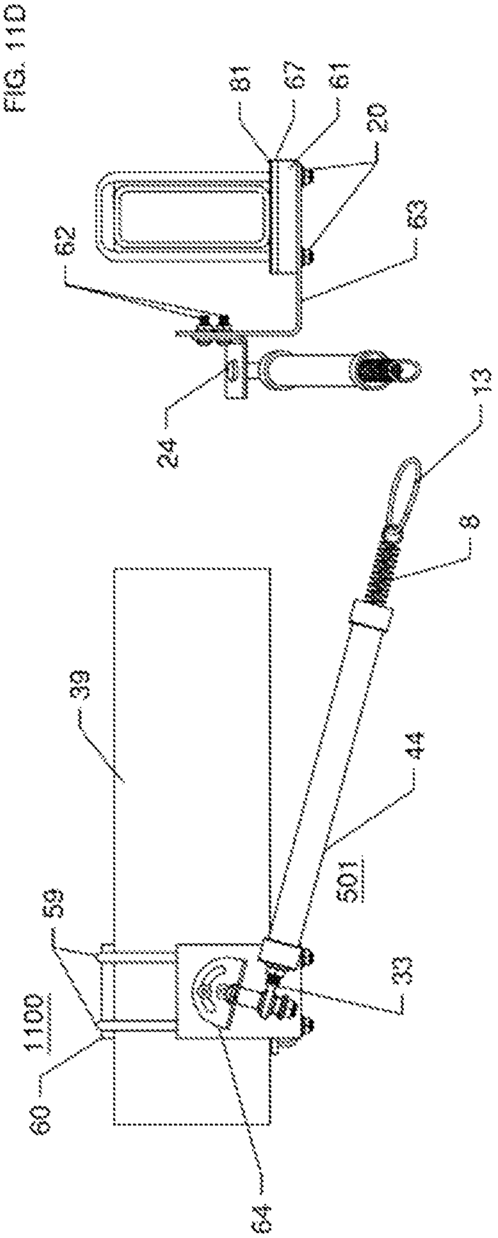
FIG. 11C shows a side view of a U frame adjustable mounting bracket in accordance with one embodiment.
FIG. 11D shows a front view of a U frame adjustable mounting bracket in accordance with one embodiment.

FIG. 11C shows a side view of a U frame adjustable mounting bracket 1100 used with an open-ended tensioner, such as open-ended tensioner 501 discussed above, in accordance with one embodiment.

FIG. 11D shows a front view of a U frame adjustable mounting bracket 1100 used with an open-ended tensioner, such as open-ended tensioner 501 discussed above, in accordance with one embodiment.

Figure 12:
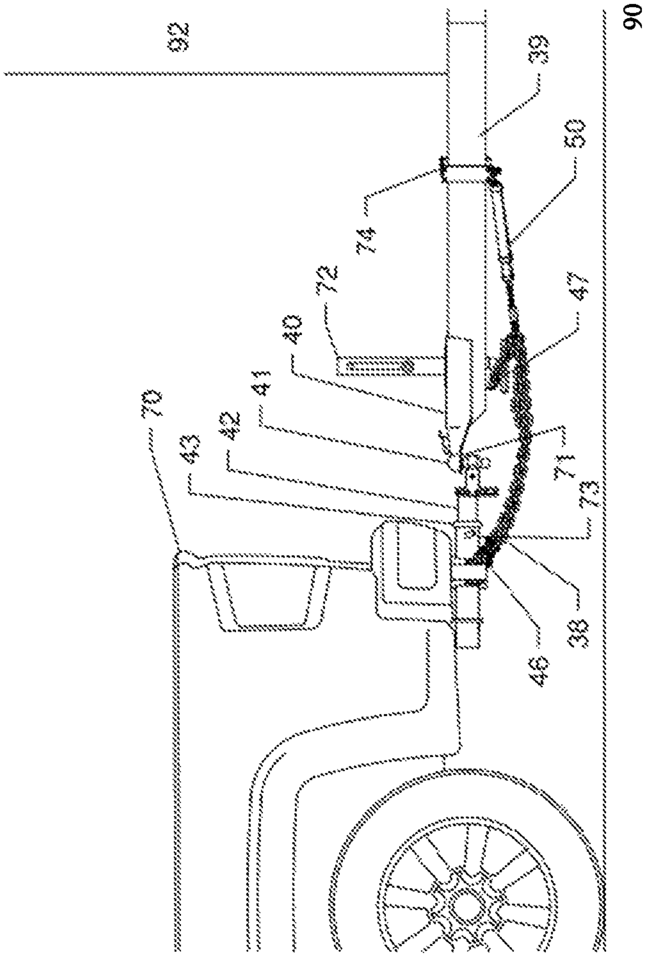
FIG. 12 shows a side view of a disclosed chain tensioner being used with a tow vehicle and trailer frame in accordance with one embodiment.

FIG. 12 shows a side view of a disclosed chain tensioner 50 being used with a tow vehicle 70 and trailer frame 39 of a trailer 92.

In various embodiments, chain tensioner 50 can be any of the chain tensioners disclosed herein such as chain tensioner 201, chain tensioner 251, chain tensioner 301, chain tensioner 321, chain tensioner 351, chain tensioner 501, chain tensioner 600, or any combinations and variations thereof.

Also seen in FIG. 12 is chain tensioner bracket 74. In various embodiments, chain tensioner bracket 74 can be any chain tensioner mounting system disclosed herein.

As seen in FIG. 12, tow vehicle 70 and trailer frame 39 of trailer 92 include tow vehicle receiver 43, vehicle hitch 42, hitch ball 71, trailer tongue jack 72, receiver hitch pin 73, distal chain attachment points 46, and safety chains 38. Of note is the fact that two safety chains 38 are shown in FIG. 12 for simplicity and clarity. However, in some cases a single safety chain, or two or more safety chains, such as safety chains 38, are commonly used.

Also shown in FIG. 12 is a portion of a typical trailer frame 39 with trailer tongue 40 and trailer coupler 41. As seen in FIG. 12, trailer frame 39 also includes proximal trailer safety chain attachment points 47.

As seen in FIG. 12, safety chains 38 are attached at a first, or distal end, to distal chain attachment points 46 and at a second, or proximal end, to proximal trailer safety chain attachment points 47. The purpose of safety chains, such as safety chains 38, is to provide a temporary back up system to keep trailer frame 39, and therefore the trailer 92, coupled to towing vehicle receiver 43, and therefore the towing vehicle 70 in case trailer coupler 41 disconnects from vehicle hitch 42 and/or vehicle receiver 43. In the event of such a trailer coupler 41/vehicle hitch 42 detachment, the safety chains, such as safety chains 38, temporarily keep the trailer and towing vehicle attached at least until the driver can pull off the road. Consequently, safety chains, such as safety chains 38, are a critical safety feature used on virtually all standard hitch towing systems.

As seen in FIG. 12, the use of a disclosed chain tensioner 50 results in no slack in safety chains 38. As result, using the disclosed chain tensioner 50 no portion of safety chains 38 are able to contact the ground surface 90.

Figure 13:
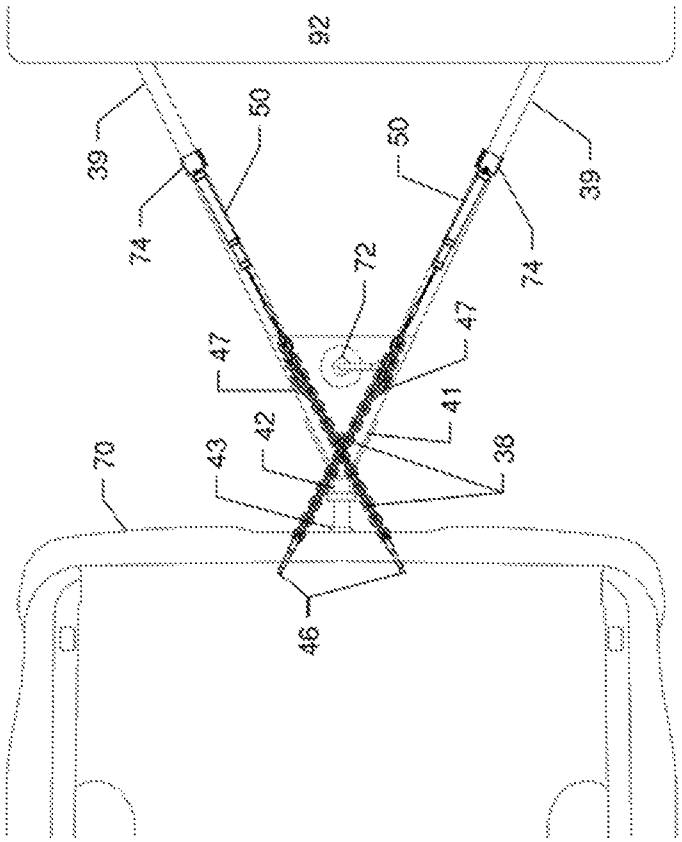
FIG. 13 shows an overhead view of a disclosed chain tensioner being used with a tow vehicle and trailer frame in accordance with one embodiment.

FIG. 13 shows an overhead view of the use of two disclosed chain tensioners 50 being used with tow vehicle 70 and trailer frame 39 of trailer 92.

In various embodiments, chain tensioner 50 can be any of the chain tensioners disclosed herein such as chain tensioner 201, chain tensioner 251, chain tensioner 301, chain tensioner 321, chain tensioner 351, chain tensioner 501, chain tensioner 600, or any combinations and variations thereof.

Also seen in FIG. 13 is chain tensioner bracket 74. In various embodiments, chain tensioner bracket 74 can be any chain tensioner mounting system disclosed herein.

As seen in FIG. 13, tow vehicle 70 and trailer frame 39 of trailer 92 includes tow vehicle receiver 43, vehicle hitch 42, trailer tongue jack 72, distal chain attachment points 46, and safety chains 38. Of note is the fact that two safety chains 38 are shown in FIG. 13 for simplicity and clarity. However, in some cases a single safety chain, or two or more safety chains, such as safety chains 38, are commonly used.

Also shown in FIG. 13 is a portion of a typical trailer frame 39 and trailer coupler 41. As seen in FIG. 13, trailer frame 39 also includes proximal trailer safety chain attachment points 47.

As seen in FIG. 13, safety chains 38 are attached at a first, or distal end, to distal chain attachment points 46 and at a second, or proximal end, to proximal trailer safety chain attachment points 47. The purpose of safety chains, such as safety chains 38, is to provide a temporary back up system to keep trailer frame 39, and therefore the trailer 92, coupled to towing vehicle receiver 43, and therefore the towing vehicle 70 in case trailer coupler 41 disconnects from vehicle hitch 42 and/or vehicle receiver 43. In the event of such a trailer coupler 41/vehicle hitch 42 detachment, the safety chains, such as safety chains 38, temporarily keep the trailer and towing vehicle attached at least until the driver can pull off the road. Consequently, safety chains, such as safety chains 38, are a critical safety feature used on virtually all standard hitch towing systems.

As seen in FIG. 13, the use of a disclosed chain tensioner 50 results in no slack in safety chains 38. As result, using the disclosed chain tensioner 50 no portion of safety chains 38 are able to contact the ground.

Embodiments of the present disclosure provide a technical solution to the long-standing technical problem of providing a method and system for effectively and dynamically securing safety chains in a reliable and consistent manner that reduces the slack portion and thereby eliminates the safety chain slack issue.

To this end, the disclosed embodiments include safety chain tensioners including safety chain tension elements, and mounting systems. In various embodiments, a first end of the disclosed safety chain tensioner is connected to a safety chain. The safety chain is also connected to the towing vehicle, typically the towing hitch of the towing vehicle. A second end of the safety chain tensioner is connected to one of the disclosed mounting systems. The mounting system is, in turn, attached to the trailer to be towed, typically to a frame and/or tongue of the trailer to be towed.

In various embodiments, the safety chain tensioner includes a tensioning element, such as a spring, tension spring, compression spring, rotary spring, etc. that keeps a relatively constant, and dynamically/automatically adjustable tension, on the safety chain such that any potential slack in the safety chains is automatically taken up by the relatively constant, and dynamically/automatically adjustable, tension on the safety chain provided by the safety chain tensioner.

Consequently, using the disclosed embodiments, the critical advantageous features of safety chains, such as providing an emergency linkage if the trailer is unhitched from the towing vehicle, are provided while avoiding the potential prior art hazards presented by slack in the safety chains once they are connected. Thus, using the disclosed embodiment, slack in the safety chains is all but eliminated by a relative constant and dynamically/automatically adjustable tension provided to the safety chains by the disclosed tensioner systems. Consequently, using the disclosed embodiments, safety chains no longer drag along the ground as the vehicle is moving down the road. This represents a significant safety improvement over prior art systems.

For instance, using the disclosed embodiments, there is no significant safety chain slack to drag along the ground and create sparks and friction. Consequently, the significant fire hazard represented by dragging safety chain slack is eliminated.

In addition, using the disclosed embodiments, there is no significant safety chain slack to drag along the ground and therefore pieces of the safety chains are not subject to breaking off. Consequently, the hazards in the form of flying debris, tire hazards for other vehicles, and driver distractions, are all but eliminated using the disclosed embodiments.

In addition, unlike prior art improvised methods including wrapping or folding safety chains to eliminate slack in the chains, the disclosed embodiments do not weaken the safety chains and are consistent and reliable.

In addition, unlike prior art improvised methods including elastic cords and/or bungee cords to eliminate slack in the safety chains, the disclosed embodiments are highly effective, dynamic, automatic and effective and consistent in their ability to maintain the desired length of chain and take up the slack.

Therefore, the disclosed embodiments provide the ability to effectively, dynamically, and automatically adjust the length of safety chains in a reliable and consistent manner. In this way, the disclosed embodiments provide a technical solution to the long-standing technical problem of providing a method and system for effectively and dynamically securing safety chains in a reliable and consistent manner that reduces the slack portion and thereby eliminates the safety chain slack issue.

The present invention has been described in particular detail with respect to specific possible embodiments. Those of skill in the art will appreciate that the invention may be practiced in other embodiments. For example, the nomenclature used for components, capitalization of component designations and terms, the attributes, or structural aspect is not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations and structures shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The invention claimed is:

1. A trailer safety chain tensioning system, the trailer safety chain tensioning system comprising:

at least one safety chain tensioner mounting system; and at least one telescoping articulating tensioner, the at least one telescoping articulating tensioner including:

an inner telescoping articulating tensioner tube having an inner telescoping articulating tensioner tube diameter;

an outer telescoping articulating tensioner tube having an outer telescoping articulating tensioner tube diameter, wherein the inner telescoping articulating tensioner tube diameter is smaller than the outer telescoping articulating tensioner tube diameter and at least a portion of the inner telescoping articulating tensioner tube is positioned within the outer telescoping articulating tensioner tube such that the inner telescoping articulating tensioner tube can move laterally along a outer telescoping articulating tensioner tube longitudinal axis within the outer telescoping articulating tensioner tube, further wherein the inner telescoping articulating tensioner tube and outer telescoping articulating tensioner tube form a tensioning element space having a tensioning element space length that changes as the inner telescoping articulating tensioner tube moves within the outer telescoping articulating tensioner tube;

a tensioning element positioned within the tensioning element space formed by the inner telescoping articulating tensioner tube and the outer telescoping articulating tensioner tube;

a telescoping articulating tensioner first end for connecting to a slack portion of a trailer safety chain;

a telescoping articulating tensioner second end for connecting to the at least one safety chain tensioner mounting system, wherein when the telescoping articulating tensioner first end of the at least one telescoping articulating tensioner is attached to the slack portion of a trailer safety chain and the telescoping articulating tensioner second end of the at least one telescoping articulating tensioner is attached to the at least one safety chain tensioner mounting system the telescoping articulating tensioner exerts a substantially constant and automatically adjustable tension on the safety chain slack portion to reduce the safety chain slack portion and prevent the safety chain slack portion from contacting the ground.

2. The trailer safety chain tensioning system of claim 1 wherein the at least one safety chain tensioner mounting system is attached to a trailer to be towed.

3. The trailer safety chain tensioning system of claim 1 wherein the at least one safety chain tensioner mounting system is attached to a tow vehicle.

4. The trailer safety chain tensioning system of claim 1 wherein the trailer safety chain tensioning system includes two safety chain tensioner mounting systems and two telescoping articulating tensioners.

5. The trailer safety chain tensioning system of claim 1 wherein at least one of the at least one safety chain tensioner mounting system is selected from the group of safety chain tensioner mounting systems consisting of:

a swivel clamp safety chain tensioner mounting system;
a ball joint clamp safety chain tensioner mounting system;
a tube mount safety chain tensioner mounting system;
a swivel clamp and tube mount safety chain tensioner mounting system;
a U frame safety chain tensioner mounting system; and
an articulating tensioner clamp mount assembly safety chain tensioner mounting system.

6. The trailer safety chain tensioning system of claim 1 wherein the tensioning element of the at least one telescoping articulating tensioner is selected from the group of tensioning elements including:

a simple spring;
a tension spring;
a compression spring;
a rotary spring;
a tension spring and wire rope; and
a tension spring and rod.

7. The trailer safety chain tensioning system of claim 1 wherein the at least one telescoping articulating tensioner includes a safety release.

8. A method for providing a trailer safety chain tensioning system, the method comprising:

providing at least one safety chain tensioner mounting system;

providing at least one telescoping articulating tensioner, the at least one telescoping articulating tensioner including:

an inner telescoping articulating tensioner tube having an inner telescoping articulating tensioner tube diameter;

an outer telescoping articulating tensioner tube having an outer telescoping articulating tensioner tube diameter, wherein the inner telescoping articulating tensioner tube diameter is smaller than the outer telescoping articulating tensioner tube diameter and at least a portion of the inner telescoping articulating tensioner tube is positioned withing the outer telescoping articulating tensioner tube such that the inner telescoping articulating tensioner tube can move laterally within the outer telescoping articulating tensioner tube along a longitudinal axis of the outer telescoping articulating tensioner tube, further wherein, the inner telescoping articulating tensioner tube and outer telescoping tube form a tensioning element space having a tensioning element space length that changes as the inner telescoping articulating tensioner tube moves within the outer telescoping articulating tensioner tube;

a tensioning element positioned within the tensioning element space formed by the inner telescoping articulating tensioner tube and the outer telescoping articulating tensioner tube;

a telescoping articulating tensioner first end for connecting to a slack portion of a trailer safety chain;

a telescoping articulating tensioner second end for connecting to the at least one safety chain tensioner mounting system;

attaching the telescoping articulating tensioner first end of the at least one telescoping articulating tensioner to the slack portion of a trailer safety chain; and attaching the telescoping articulating tensioner second end of the at least one telescoping articulating tensioner to the at least one safety chain tensioner mounting system such that the telescoping articulating tensioner exerts a substantially constant and automatically adjustable tension on the safety chain slack portion to reduce the safety chain slack portion and prevent the safety chain slack portion from contacting the ground.

9. The method of claim 8 wherein the at least one safety chain tensioner mounting system is attached to a trailer to be towed.

10. The method of claim 8 wherein the at least one safety chain tensioner mounting system is attached to a tow vehicle.

11. The method of claim 8 wherein the trailer safety chain tensioning system includes two safety chain tensioner mounting systems and two telescoping articulating tensioners.

12. The method of claim 8 wherein at least one of the at least one safety chain tensioner mounting system is selected from the group of safety chain tensioner mounting systems consisting of:

a swivel clamp safety chain tensioner mounting system;
a ball joint clamp safety chain tensioner mounting system;
a tube mount safety chain tensioner mounting system;
a swivel clamp and tube mount safety chain tensioner mounting system;
a U frame safety chain tensioner mounting system; and
an articulating tensioner clamp mount assembly safety chain tensioner mounting system.

13. The method of claim 8 wherein the tensioning element of the at least one telescoping articulating tensioner is selected from the group of tensioning elements including:

a simple spring;
a tension spring;
a compression spring;
a rotary spring;
a tension spring and wire rope; and
a tension spring and rod.

14. The method of claim 8 wherein the at least one telescoping articulating tensioner includes a safety release.

15. A system, the system comprising:

at least one safety chain tensioner ball joint mounting system; and at least one telescoping articulating tensioner, the at least one telescoping articulating tensioner including:

an inner telescoping articulating tensioner tube having an inner telescoping articulating tensioner tube diameter;

an outer telescoping articulating tensioner tube having an outer telescoping articulating tensioner tube diameter, wherein the inner telescoping articulating tensioner tube diameter is smaller than the outer telescoping articulating tensioner tube diameter and at least a portion of the inner telescoping articulating tensioner tube is positioned withing the outer telescoping articulating tensioner tube such that the inner telescoping articulating tensioner tube can move laterally within the outer telescoping articulating tensioner tube along a longitudinal axis of the outer telescoping articulating tensioner tube, further wherein the inner telescoping articulating tensioner tube and outer telescoping tube form a tensioning element space having a tensioning element space length that changes as the inner telescoping articulating tensioner tube moves within the outer telescoping articulating tensioner tube;

a tensioning element positioned within the tensioning element space formed by the inner telescoping articulating tensioner tube and the outer telescoping articulating tensioner tube;

a telescoping articulating tensioner first end for connecting to a slack portion of a trailer safety chain;

a telescoping articulating tensioner second end for connecting to the at least one safety chain tensioner ball joint mounting system wherein when the telescoping articulating tensioner first end of the at least one telescoping articulating tensioner is attached to the slack portion of a trailer safety chain and the telescoping articulating tensioner second end of the at least one telescoping articulating tensioner is attached to the at least one safety chain tensioner ball joint mounting system the telescoping articulating tensioner exerts a substantially constant and automatically adjustable tension on the safety chain slack portion to reduce the safety chain slack portion and prevent the safety chain slack portion from contacting the ground.

16. The system of claim 15 wherein the at least one safety chain tensioner ball joint mounting system is attached to the trailer to be towed.

17. The system of claim 15 wherein the at least one safety chain tensioner ball joint mounting system is attached to the tow vehicle.

18. The system of claim 15 further comprising at least two second ball joint mounting systems and at least two telescoping articulating tensioners.

19. The system of claim 15 wherein the tensioning element of the at least one telescoping articulating tensioner is selected from the group of tensioning elements including:

a simple spring;

a tension spring;

a compression spring;

a rotary spring;

a tension spring and wire rope; and a tension spring and rod.

20. The system of claim 15 wherein the at least one telescoping articulating tensioner includes a safety release.

* * * * *